United States Patent [19]

Even et al.

[11] Patent Number: 5,611,043
[45] Date of Patent: Mar. 11, 1997

[54] DEBUGGER SYSTEM AND METHOD FOR CONTROLLING CHILD PROCESSES

[75] Inventors: Lindsay W. Even, Campbell; Jonathan B. Rosenberg, Scotts Valley, both of Calif.

[73] Assignee: Borland International, Inc., Scotts Vallay, Calif.

[21] Appl. No.: 210,337

[22] Filed: Mar. 18, 1994

[51] Int. Cl.$^6$ ........................................... G06F 11/34
[52] U.S. Cl. ........................................... 395/183.14
[58] Field of Search ............................ 395/575, 183.01, 395/183.1, 183.11, 183.14, 375; 371/19, 15.1; 364/275.5, 285.2

[56] References Cited

U.S. PATENT DOCUMENTS

| | | | |
|---|---|---|---|
| 4,080,651 | 3/1978 | Cronshaw et al. | 364/200 |
| 4,257,096 | 3/1981 | McCullough et al. | 364/200 |
| 4,445,173 | 4/1984 | Pilat et al. | 364/200 |
| 4,450,522 | 5/1984 | Pilat et al. | 364/200 |
| 4,454,580 | 6/1984 | Page et al. | 364/200 |
| 4,511,964 | 4/1985 | George et al. | 364/200 |
| 4,649,480 | 3/1987 | Ohki et al. | |
| 4,819,234 | 4/1989 | Hubet | 364/200 |
| 4,945,480 | 7/1990 | Clark et al. | 364/200 |
| 4,984,150 | 1/1991 | Mori | 364/200 |
| 4,989,137 | 1/1991 | Oxley et al. | 364/200 |
| 5,023,773 | 6/1991 | Baum et al. | 364/200 |
| 5,032,981 | 7/1991 | Bril et al. | 364/200 |
| 5,043,869 | 8/1991 | Suzuki et al. | |
| 5,095,423 | 3/1992 | Gramlich et al. | 395/600 |
| 5,117,349 | 5/1992 | Tirfing et al. | 395/600 |
| 5,124,989 | 6/1992 | Padawer et al. | 371/19 |
| 5,129,082 | 7/1992 | Tirfing et al. | 395/600 |
| 5,140,671 | 8/1992 | Hayes et al. | 395/76 |
| 5,179,702 | 1/1993 | Spix et al. | 395/650 |
| 5,189,733 | 2/1993 | Bennett et al. | 395/650 |
| 5,341,483 | 8/1994 | Frank et al. | 364/200 |

OTHER PUBLICATIONS

Olsson et al "Sequential Debugging at a High Level of Abstraction" IEEE 1991 pp. 27–35.

Renner et al "Debugging Run–time Errors" 1989 IEEE, pp. 495–503.

Miller et al "Breakpoints of Halting in Distributed Programs" 1988 IEEE pp. 316–323.

Ponamgi et al "Debugging Multithreaded Programs with MPD" IEEE 1991, pp. 37–42.

Dewar, R. and Smosna, M., *Microprocessors: A Programmer View*, Virtual Memory Management, pp. 112–126.

Hummel, Robert L., *PC Magazine Programmer's Technical Reference: The Processor and Coprocessor*, Chapter 4: Memory Structure and Management, pp. 86–105.

Patterson, D. and Hennessy, J., *Computer Architecture: A Quantitative Approach*, pp. 432–449.

Pietrek, M., *Writing a Windows Debugger*, Windows/DOS Developer's Journal, Jun. 1992, pp. 6–12.

Tanenbaum, A., *Operating Systems: Design and Implementation*, pp. 206–212.

Williams, A., *Homegrown Debugging—386 Style?*, Dr. Dobb's Journal, Mar. 1990, pp. 48–57 and 98–100.

(List continued on next page.)

*Primary Examiner*—Hoa T. Nguyen
*Assistant Examiner*—Albert T. De'Cady
*Attorney, Agent, or Firm*—John A. Smart; Vernon A. Norviel; Michael J. Ritter

[57] ABSTRACT

A debugging system that allows programmers and software developers to more efficiently find and correct for errors in software applications. Preferred methods of the present invention includes the steps of setting and clearing watchpoints, statement stepping a program, and stopping a program from a debugger. One method provides for a table of watchpoints in the debugger. The debuggee is executed and, when an exception is generated, an address location of the exception is evaluated against the table of watchpoints to determine if a watchpoint has been encountered.

29 Claims, 9 Drawing Sheets

OTHER PUBLICATIONS

Yao, P., *An Introduction to Windows NT Memory Management Fundamentals,* Microsoft Systems Journal, Jul.–Aug. 1992, pp. 41–49.

Schmidt, et al., *Borland International Inc. Turbo Pascal 5.5,* PC Week, vol. V7, No. 15, Apr. 1990, p. 126.

Nance, B., *Speaking OS/2's Native Language,* Byte, vol. 15, No. 9, Sep. 1990, pp. 206, 208 & 210.

Sametinger, J., *A Tool for the Maintenance of C ++ Programs,* Proc. IEEE Conference on Software Maintenance, 1990, pp. 54–59.

Dewar, R. and Smosna, M., *Microprocessors: A Programmer's View,* McGraw–Hill Publishing Co., 1990, pp. 112–126.

Hummel, R., *PC Magazine Programmer's Technical Reference: The Processor and Coprocessor,* Chapter 4: Memory Structure and Management, Ziff–Davis Press, 1992, pp. 86–105.

Patterson, D. and Hennessy, J., *Computer Architecture: A Quantitative Approach,* Morgan Kaufmann Publishers, Inc., 1990, pp. 432–449.

Tanenbaum, A., *Operating Systems: Design and Implementation,* Prentice–Hall, Inc., 1987, pp. 207–212.

DEBUGGER SYSTEM AND METHOD FOR CONTROLLING CHILD PROCESSES

COPYRIGHT NOTICE

A portion of the disclosure of this patent document contains material which is subject to copyright protection. The copyright owner has no objection to the xerographic reproduction by anyone of the patent document or the patent disclosure exactly as it appears in the Patent and Trademark Office patent file or records, but otherwise reserves all other copyright rights whatsoever.

BACKGROUND OF THE INVENTION

The present invention relates generally to system and methods for increasing reliability of software programs. More particularly, the present invention relates to a debugging system and methods which assist software developers with the task of finding and eliminating errors in software programs operative on digital computers.

Before a digital computer may accomplish a desired task, it must receive an appropriate set of instructions. Executed by the computer's microprocessor, these instructions, collectively referred to as a "computer program," direct the operation of the computer. Expectedly, the computer must understand the instructions which it receives before it may undertake the specified activity.

Owing to their digital nature, computers essentially only understand "machine code," i.e., the low-level, minute instructions for performing specific tasks—the sequence of ones and zeros that are interpreted as specific instructions by the computer's microprocessor. Since machine language or machine code is the only language computers actually understand, all other programming languages represent ways of structuring human language so that humans can get computers to perform specific tasks.

While it is possible for humans to compose meaningful programs in machine code, practically all software development today employs one or more of the available programming languages. The most widely used programming languages are the "high-level" languages, such as C or Pascal. These languages allow data structures and algorithms to be expressed in a style of writing which is easily read and understood by fellow programmers.

A program called a "compiler" translates these instructions into the requisite machine language. In the context of this translation, the program written in the high-level language is called the "source code" or source program. The ultimate output of the compiler is an "object module," which includes instructions for execution by a target processor. Although an object module includes code for instructing the operation of a computer, the object module itself is not in a form which may be directly executed by a computer. Instead, it must undergo a "linking" operation before the final executable program is created.

Linking may be thought of as the general process of combining or linking together one or more compiled object modules to create an executable program. This task usually falls to a program called a "linker." In typical operation, a linker receives, either from the user or from an integrated compiler, a list of object modules desired to be included in the link operation. The linker scans the object modules from the object and library files specified. After resolving interconnecting references as needed, the linker constructs an executable image by organizing the object code from the modules of the program in a format understood by the operating system program loader. The end result of linking is executable code (typically an .exe file) which, after testing and quality assurance, is passed to the user with appropriate installation and usage instructions.

During the course of software development, substantial development resources are allocated today to the process of finding "bugs" in the software. As used herein, "bugs" refer to errors occurring in the program being developed. Bugs, for example, can be anything from taking an unexpected path in the logical flow to inadvertently writing to a wrong memory location. Expectedly, there is keen interest in finding ways to improve the "debugging" of software.

A program called a "debugger" is often employed for finding and eliminating errors in software programs. A software program being evaluated by a debugger will be referred to as a "debuggee." Of particular interest to the present invention are debuggers designed for operating systems with graphic user interfaces (GUIs), such as Microsoft® Windows™.

The general topic of debuggers is well covered by the technical, trade, and patent literature. For a detailed introduction to the topic, the reader may consult Swan, T., *Mastering Turbo Debugger*, Hayden Books, 1990. Additional treatment of the topic may be found in Intel Corporation's 80386 *Programmer's Reference Manual*, Intel Corp., Santa Clara, Calif., 1986. The disclosures of the foregoing are hereby incorporated by reference.

A debugger should provide certain basic services to assist programmers in finding and correcting errors in software programs. These services include breakpointing, stepping and stopping a debuggee. Other services may include inspecting and changing data in memory, symbolic debugging, source level debugging, and setting breakpoints with expression evaluation.

Of interest to the present invention is "watchpointing," which refers to the ability of the debugger to stop the debuggee when data in memory are altered. Traditionally, watchpointing is accomplished either through the use of debugging registers provided by the hardware or with "single stepping." Single stepping is the process where the debugger instructs the operating system to execute the child process one instruction at a time and to check memory to see if data therein has changed after each statement.

In the first watchpointing method, hardware support in the form of debugging registers is required by the computer. The debugging registers are used to disallow access to selected areas of memory at a "fine grained" level. This "hardware watchpointing" has the advantage of allowing the operating system to execute the debuggee at full speed until the data in the selected memory regions are altered. Although hardware watchpointing is often preferable, it is not always available to the programmer since some computer architectures do not provide the necessary registers or hardware to support it. Even if the hardware supports debugging, watchpointing is usually limited because the number of hardware watchpoints corresponds to the number of debugging registers available. For example, an Intel x86 processor has only four hardware debugging registers. Therefore, a system with an x86 processor supports, at most, four hardware watchpoints. The limited number of watchpoints may impact the effectiveness of the debugger when it is used to debug more complex programs.

A second, "software watchpointing" approach to the foregoing problem is to step through the debuggee one instruction at a time and examine memory to see if the memory contents have been changed after each step. Although the process may be somewhat automated with a debugger, it is time consuming, thus making it impractical for anything but small applications. Moreover, the approach does not inform the user when memory is accessed or read. Sometimes, it is desirable to stop a debuggee whenever a region of memory is accessed, not just when data therein are changed. For example, assume that a bug occurs when the debuggee takes a certain path. Further, assume that the debuggee takes this erroneous path numerous times, but only alters the data therein at the nth pass. Using this watchpointing approach, the error will be detected only after the nth access to that memory location, thus increasing the time needed to find bugs.

Also of interest to the present invention is the notion of "stepping." Stepping refers to process of executing the debuggee one instruction at a time. To step an instruction, the debugger relies on information that links addresses in the object code to line numbers from the source code to identify where in the source code a corresponding statement(s) begins and ends. A problem may arise because some collection of statements, such as library routines, often do not contain line number references.

Currently, developers approach this problem two ways. In the first method, a breakpoint is set at the return address of the subroutine being called. Using this approach, the debugger can run the instruction containing the subroutine at full speed until it returns from the subroutine. A second method is to single step through the subroutine one instruction at a time.

However, both these approaches have pronounced disadvantages. With the first approach, potential problems may arise when a routine without debugging information calls a routine with debugging information. Since the debugger skips over the first routine, the user is not aware that the second routine was ever invoked. Consequently, bugs occurring in the second routine will be difficult to isolate. The second approach, on the other hand, is time consuming and, therefore, has limited appeal.

Also of interest to the present invention is stopping a debuggee from a debugger. Often, a user would like to stop the debuggee during execution to examine the contents of memory or for other purposes. However, stopping the debuggee may be difficult, particularly in a multitasking GUI environment where a debuggee typically spawns numerous threads.

A "thread" as used herein refers to an executable entity that belongs to one and only one process, which in this instance is the debuggee. Generally, a thread comprises a program counter, a user-mode stack, a kernel-mode stack and a set of register values. All threads in a process have equal access to the debuggee's address space, object handles, and other resources. A dispatcher keeps track of the thread schedule, which refers to selecting the order that the threads are executed and initiating context switching from one thread to another.

As shown, stopping a debuggee also entails stopping all of its associated threads. Generally, debuggers stop a debuggee and its threads by looping through all the debuggee's threads and instructing each one to stop executing. This method may take considerable time to finish if there are many threads. More importantly, this can lead to changes in the thread schedule that is maintained by the dispatcher. This may result in a behavior that differs if the debuggee were executed under normal conditions. Consequently, some bugs may be obscured and become hard to find.

Clearly, there is a need for debuggers that reduce or eliminate reliance on hardware support for watchpointing. There is also a need to effectively stop a multi-threaded debuggee without modifying its thread schedule. There is still a further need to provide an efficient way of stepping through statements that have no debugging information. The present invention fulfills these and other needs.

SUMMARY OF THE INVENTION

The present invention recognizes a need for an improved debugging system for enabling programmers to efficiently and accurately isolate bugs without requiring hardware debugging support. In particular, the invention provides methods for watchpointing, stopping a debuggee and statement stepping by using memory management services to find memory regions of interest and set appropriate protection therein.

In a preferred method of the present invention for setting watchpoints, a protection mode in memory regions defined by the programmer is set to no-access. Preferably, information such as the location, size and initial protection mode of these regions is stored in a database. Each of these protected regions represents a watchpoint. When an exception occurs, either from an attempted access to a protected memory region or from other reasons, the operating system transfers control to the debugger. The debugger accesses the database to identify the cause of the exception. Further, watchpoints may be cleared by restoring the specified memory region to its initial protection state and removing the corresponding information from the database.

In a preferred method for stopping a debuggee, all executable regions in memory belonging to the debuggee are set to no-access. These regions include the regions that the operating system allocated to the debuggee's threads. The address, size and initial protection state of these regions are stored in a database. An interrupt occurs when the debuggee or its threads attempt to access any of these regions. The exception stops the debuggee and its threads; control of the system is transferred to the debugger. To continue debugging, the debugger accesses the database and restores the regions listed therein to their initial mode.

In another aspect of the present invention, methods for stepping a debuggee are provided. Particularly, the methods examine memory to determine and protect regions that contain debugging information. The regions' address, size and initial protection state are stored in a database. Any attempt to access the protected regions by the debuggee generates an interrupt. As a result, the debuggee is stopped after stepping the statement; control of the system is transferred to the debugger. The debugger then restores the regions listed in the database to their original state and, thereafter, restarts the debuggee.

Figure 1A:
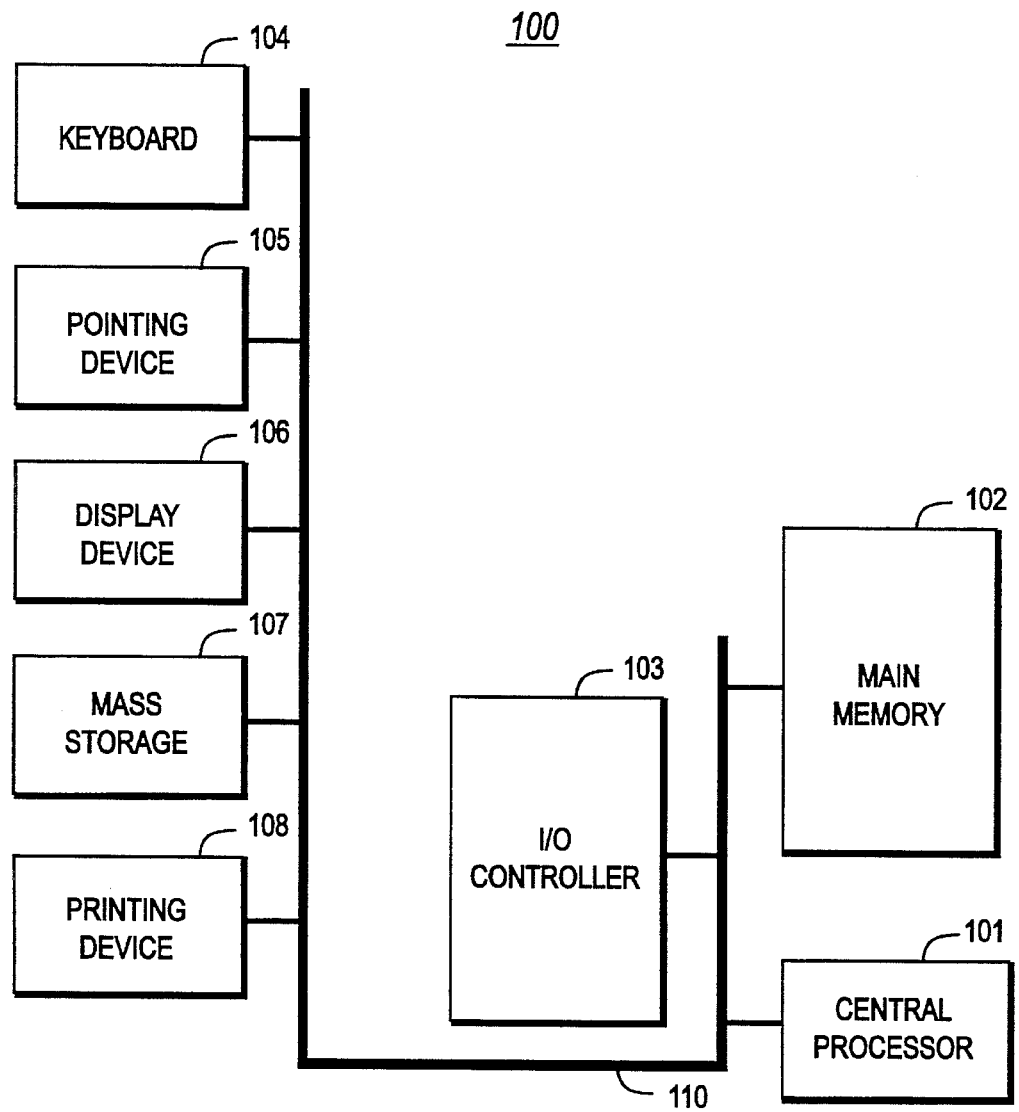
FIG. 1A is a block diagram of a computer system in which the present invention may be embodied.

GLOSSARY address: A particular location in memory. A "logical" address references a location in virtual memory. A "physical" address references an actual or real memory location.

breakpoint: A location in a program at which execution is halted so that a programmer can examine the program's status, the contents of variables, and so on. A breakpoint is set and used within a debugger and is usually implemented by inserting some kind of jump, call or trap instruction at that point, which transfers control to the debugger.

bug: In software, an error in coding or logic that causes a program to malfunction or to produce incorrect results.

debugger: A program designed to help in debugging another program by allowing the programmer to step through the program, examine data, check conditions, and the like.

debuggee: A software program being evaluated by a debugger.

debug info: Debugging information (e.g., source line number) which is (optionally) stored in compiled programs.

execution: Performance of an instruction.

instruction: An action statement given in a computer language.

operating system (OS): The software responsible for controlling the allocation and usage or hardware resources such as memory, central processing unit (CPU) time, disk space, and peripheral devices.

process: A coherent sequence of steps taken by a program.

register: A small, named region of high-speed memory located within a microprocessor or any electronic device capable of storing binary data which is used as a holding area for specific pieces of data or information related to activities going on within the system.

single step: Used to describe execution of a program within a debugger one instruction at a time.

task: A stand-alone application or a subprogram that is run as an independent entity.

thread: A process that is part of a larger process or program.

watchpoint: The ability of the debugger to stop the debuggee when data in memory (data points) are altered.

DETAILED DESCRIPTION OF A PREFERRED EMBODIMENT

CONTENTS

I. General Architecture
  A. System Hardware
  B. System Software
  C. Development System
II. Event-driven Windows Development
  A. Windows interface
  B. Event-driven Architecture and "Messages"
III. Improved Debugging
  A. Introduction to Debugging
  B. Watchpointing a Debuggee from a Debugger
    1. Introduction
    2. Watchpointing
      a. Setting Watchpoints
      b. Clearing Watchpoints
      c. Exception Handling
    3. Exemplary Embodiment
      a. Setting Watchpoints
        i. set_datapoint
        ii. set_clr_datapoint
        iii. set_page_datapoint
      b. Clearing Watchpoints
        i. clr_datapoint
      c. Exception Handler
        i. Access Violation Exception
        ii. Single Step Exception
  C. Stopping a Debuggee
    1. Introduction
    2. Exemplary Embodiment
      a. stop
      b. reprotect
  D. Statement Stepping a Debuggee
    1. Introduction
    2. Exemplary Embodiment
      a. protect_debuggable_code.
      b. unprotect_debuggable_code

I. General Architecture

A. System Hardware

The present invention may be embodied on a computer system such as the system 100 of FIG. 1A, which includes a central processor 101, a main memory 102, an input/output controller 103, a keyboard 104, a pointing device 105 (e.g., mouse, track ball, pen device, or the like), a display device 106, and a mass storage 107 (e.g., hard disk). Additional input/output devices, such as a printing device 108, may be provided with the system 100 as desired. As shown, the various components of the system 100 communicate through a system bus 110 or similar architecture.

B. System Software

The following description will focus on one preferred embodiment of the present invention. In this embodiment, the invention is operative in an event-driven system, such as the Microsoft® Windows™ environment. The present invention, however, is not limited to any particular application or any particular environment. Instead, those skilled in the art will find that the system and methods of the present invention may be advantageously applied to a variety of platforms and environments, whether command-line or GUI based, including MS-DOS, Macintosh, UNIX, NextStep, and the like. Therefore, the description of the exemplary embodiments which follows is for purposes of illustration and not limitation.

Figure 1B:
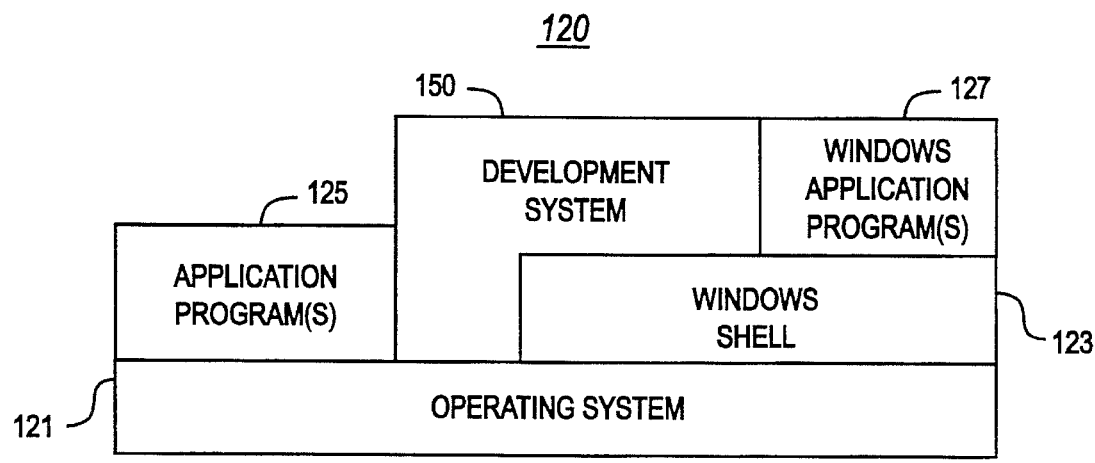
FIG. 1B is a block diagram of a software system for controlling the operation of the system of FIG. 1A, the software system including a development system of the present invention.

Illustrated in FIG. 1B, a computer software system 120 is provided for programming the operation of the computer system 100. Software system 120, which is stored in system memory 102 and/or on disk memory 107, includes a kernel or operating system (OS) 121 and a windows shell or interface 123. One or more application programs, such as application programs 125 or windows applications programs 127, may be "loaded" (i.e., transferred from storage 107 into memory 102) for execution by the system 100. OS 121 and shell 123, as well as application software 125, 127 include an interface for receiving user commands and data and displaying results and other useful information. Software system 120 also includes a development system 150 of the present invention for developing system and application programs. As shown, the development system 150 includes components which interface with the system 100 through windows shell 123, as well as components which interface directly through OS 121.

In a preferred embodiment, the system 100 includes an IBM-compatible personal computer, available from a variety of vendors (including IBM of Armonk, N.Y.). Operating system 121 is MS-DOS and shell 123 is Microsoft® Windows, both of which are available from Microsoft Corporation of Redmond, Wash. Alternatively, the system 100 may be implemented in other platforms, including Macintosh, UNIX, and the like. Development systems 150 include Borland® C++, available from Borland International of Scotts Valley, Calif. Application software 125, 127, on the other hand, can be any one of a variety of application software, including word processing, database, spreadsheet, text editors, and the like.

C. Development System

Figure 1C:
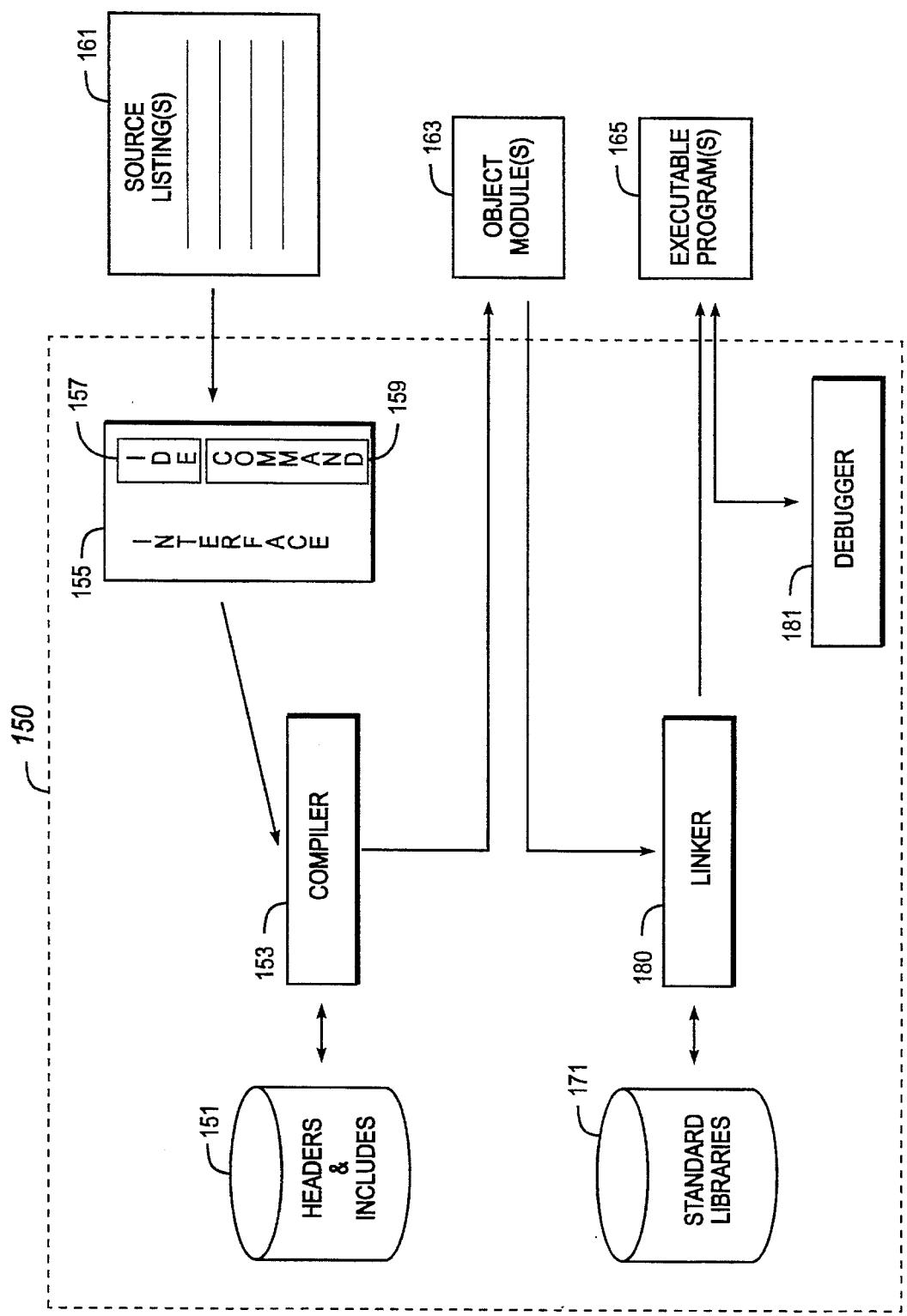
FIG. 1C is a block diagram of the development system of FIG. 1B.

Shown in further detail in FIG. 1C, the development system 150 of the present invention includes a compiler 153, a linker 180, and an interface 155. Through the interface, the developer user supplies source modules 161 to the compiler 153. Interface 155 includes both command-line driven 159 and Integrated Development Environment (IDE) 157 interfaces, the former accepting user commands through command-line parameters, the latter providing menuing equivalents thereof. From the source code or listings 161 and headers/includes files 151, the compiler 153 "compiles" or generates object module(s) 163. In turn, linker 180 "links" or combines the object modules 163 with libraries 171 to generate program(s) 165, which may be executed by a target processor (e.g., processor 101 of FIG. 1A). The standard libraries 171 include previously-compiled standard routines, such as graphics, I/O routines, startup code, math libraries and the like. A description of the general operation of development system 150 is provided with Borland® C++, available directly from Borland International.

A debugging module 181, described in greater detail below, is provided for tracking and eliminating errors in the programs 165. During compilation of a program, a developer user may specify that the program is to be compiled with "debug info." Debug info is used by the debugger 181 for tracking execution of the debuggee with the corresponding source listings.

The general construction and operation of debuggers is well described in the technical, trade, and patent literature. See e.g., Pietrek, M., *Writing a Windows Debugger*, Windows/DOS Developer's Journal, pp. 6–12, June 1992. Particular user operation of the debugger 181 is described in Borland C++: *User Guide*, Chapter 6: Using the integrated debugger, Part No. BCP1240WW21770, Borland International, 1993. Formats for debug info are described in the technical literature; see e.g., *Borland Languages: Open Architecture Handbook*, Part No. 14MN-RCH01-10, Borland International, 1991.

II. Event-driven Windows Development

A. Windows Interface

Figure 2A:
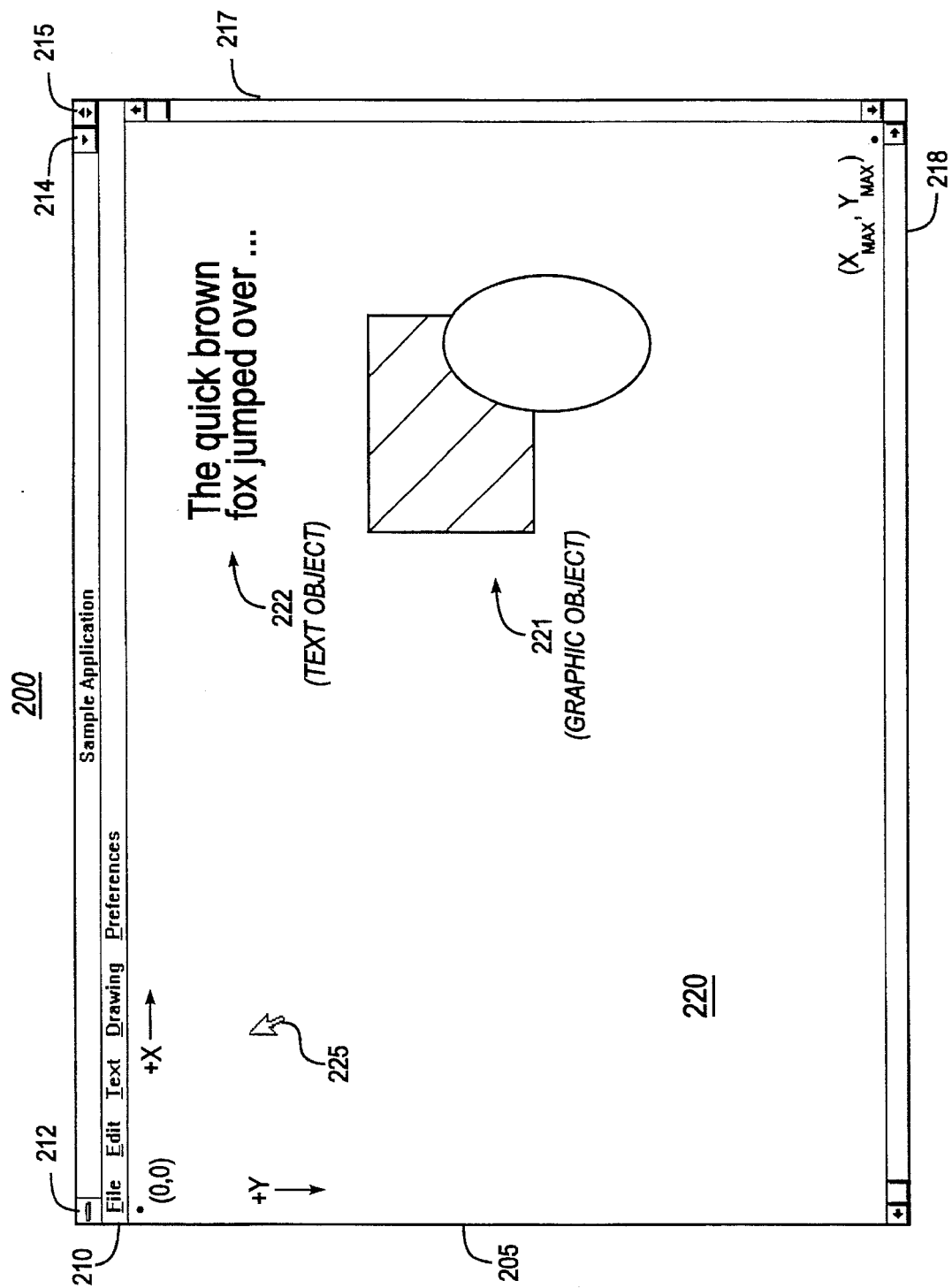
FIG. 2A is a screenshot bitmap of an event-driven graphic user interface employed in the present invention.

As shown in FIG. 2A, the system 100 typically presents its UI as a windows interface or workspace. Windows interface 200 is a rectangular, graphical user interface (GUI) providing one or more windows 205 for display on screen 106; additional window objects may be displayed in various sizes and formats (e.g., tiled or cascaded), as desired. At the top of the window is a menu bar 210 with a plurality of user-command choices, each of which may invoke additional submenus and software tools for use with application objects. Window 205 also includes a client area 220 for displaying and manipulating screen objects, such as graphic object 221 and text object 222. In essence, the client area is a workspace or viewport for the user to interact with data objects which reside in the memory 102 of the computer system 100.

Windows interface 200 includes a screen cursor or pointer 225 for selecting and otherwise invoking screen objects of interest. In response to user movement signals from the pointing device 105, the cursor 225 floats (i.e., freely moves) across the screen 106 to a desired screen location. During or after cursor movement, the user may generate user-event signals (e.g., mouse button "clicks" and "drags") for selecting and manipulating objects, as is known in the art. For example, Window 201 may be closed, resized, or scrolled by "clicking on" (selecting) screen components 212, 214/5, and 217/8, respectively. Keystroke equivalents, including keyboard accelerators or "hot keys", are provided for performing these and other user operations through keyboard 104.

B. Event-driven Architecture and "Messages"

Underlying the windows interface is a message or event-driven architecture. This model is perhaps best described by contrasting its operation with that of a modal or sequential architecture that has been traditionally employed. In this manner, the reader may appreciate the added flexibility as well as complexity of an event-driven system.

Figure 2B:
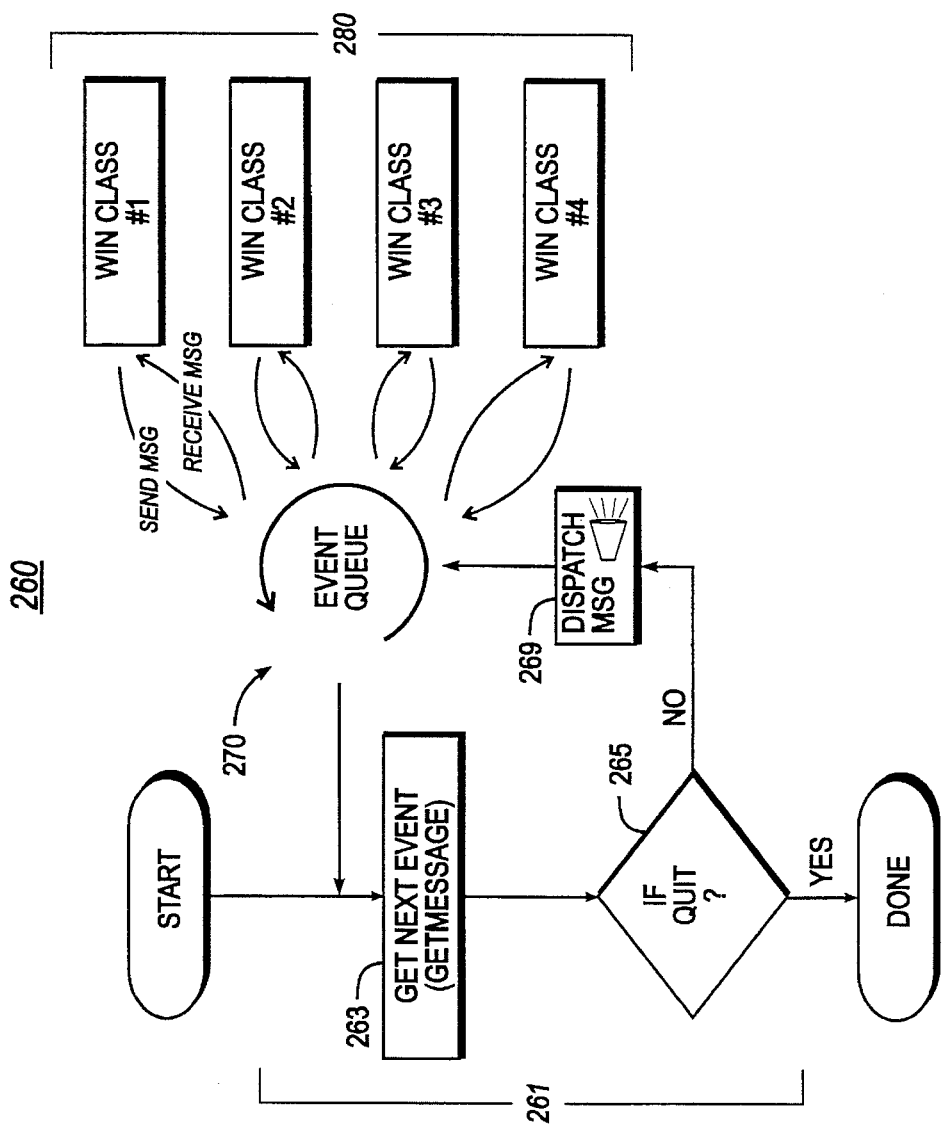
FIG. 2B is a block diagram comparing an event-driven model with traditional modal architecture.
Figure 2B:
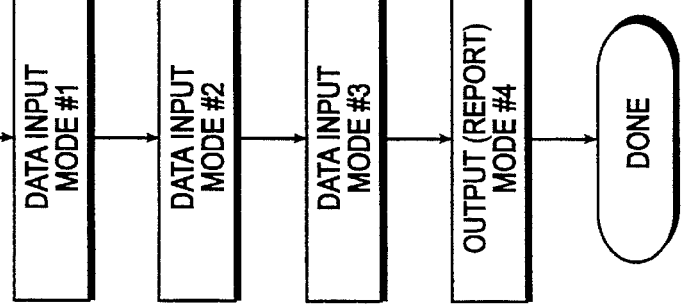

As shown in FIG. 2B, a modal program 250 comprises a series of discrete operating blocks or modes 255, with a well-defined beginning, middle and end. In actual operation, such a program typically displays a series of input screens for receiving user information, for example, to create a written report. For instance, the first entry screen may require a customer name, the second a customer address, the third a part number, and so on. The program typically terminates in an output mode, for reporting results determined from the various inputs. Thus, the program 250 follows a fairly rigid sequence of operation, with each input or entry mode demanding successful completion before the program proceeds to the next step.

While a modal program is relatively easy to design and implement, it is generally not so easy to use. The design certainly ensures that all required information is entered, but only at the expense of forcing users to operate in a manner dictated by the program. Specifically, since the program is built around a pre-arranged set of modes, a user cannot get from one mode to another without first completing a previously-required mode. In the present example, for instance, a user must needlessly complete a customer name entry screen (and any other intervening input screens) just to access part number information. Any deviation from this sequence by the user is simply not permitted. Lacking flexibility, modal programs make a poor choice for handling real-world tasks.

As shown in the second half of FIG. 2B, an event-driven architecture 260 eschews a pre-selected sequence, opting instead for an "event loop." The event loop 261 is a centralized mechanism for processing messages about user and system events. It includes an event queue 270 and mechanisms for retrieving 263 and dispatching 269 messages to various window classes 280. Before each of these components is further described, it is helpful to understand the notion of "messages."

In a typical modal environment, especially those typified by a character-based UI, a program reads from the keyboard by making an explicit call to a function, such as the C function getchar( ). The function typically waits until the user presses a key before returning the character code to the program; system activity effectively ceases until completion of this one step. In a Windows environment, in contrast, the operating system uses messages to manage and synchronize multiple applications and hardware events, such as clicks of a mouse or presses of a keyboard, which in MS-Windows are converted to messages by Windows event handlers.

From a programming perspective, a message is simply a data structure containing information about a particular event. In MS-Windows, a message structure includes a message identifier, a 16-bit unsigned integer which serves as a symbolic constant for a particular event. For example, messages from a window object might include information about creating (WM_CREATE), closing (WM_CLOSE), moving (WM_MOVE), and re-sizing (WM_SIZE) the window. Additional event data are available as message parameters (e.g., Windows wParam and lParam); the exact interpretation of a given parameter varies with each event type represented. Input messages are collected in a system-wide queue and then directed to the proper window. These messages, along with timer and screen paint (screen redraw) messages, must be passed to the target application(s) of interest.

A mechanism is provided for retrieving messages from the system queue and dispatching them to the appropriate application which, in turn, may proceed to process any message that arrives. Each window belongs to a particular window type which defines certain characteristics common to all windows of that type. Associated with each type is a Windows function which processes all messages sent to windows of its type. An application queue is provided where Windows may place messages that belong to a specific application. When the application is ready to receive input, it simply reads the awaiting messages. If none are found or if there exists a message for other applications with higher priority, Windows passes control to the other applications.

To process these events, therefore, a message or event loop 261 may be simply constructed as:

while (GetMessage (&msg, NULL, 0, 0))
{
TranslateMessage (&msg);
DispatchMessage (&msg);
} where a message (&msg) is retrieved by a call to GetMessage (step 263); if needed, the retrieved message may be translated by a call to TranslateMessage and then dispatched by a call to DispatchMessage (step 269). This "while" loop continues until the GetMessage function returns a value of zero—indicating that the loop has read a WM_QUIT message from the queue, telling the application to end (yes at step 265).

The general mechanism for retrieving and dispatching messages in an event-based system, such as Microsoft® Windows, is known in the art; see, e.g., Petzold, C., *Programming Windows*, Second Edition, Microsoft Press, 1990. Additional information can be found in Microsoft's Windows Software Development Kit, including: 1) *Guide to Programming*, 2) *Reference, Vols. 1 and 2*, and 3) *Tools*, all available from Microsoft Corp. of Redmond, Wash. The disclosures of each of the foregoing are hereby incorporated by reference.

III. Improved Debugging

A. Introduction: Virtual memory

According one aspect of the present invention, watchpointing functions are provided which eliminate reliance on hardware support. In particular, the watchpointing functions provided by the debugger do not depend on debugging registers for stopping a debuggee upon reaching a watchpoint. Instead, the functions utilize software-directed methods to implement watchpointing capabilities. Particularly, the debugger relies on standard memory management services provided by the operating system to allow and disallow access to the memory pages that contain watchpoints or addresses of interest to the debugger.

Before describing specific watchpointing techniques of the present invention, it is helpful to first review generally how a computer system manages memory resources. The memory of most computer systems has associated with it a logical memory structure or layout. This is ultimately mapped into a physical memory layout, which is organized as a series of 1-byte storage units. The manner in which the operating system translates from one structure to another is known as "mapping."

A software program views memory as not in terms of physical memory but as logical memory or "virtual memory." In order to provide more memory than is physically available, virtual memory does not correspond directly with the physical memory structure. For instance, the number of physical addresses on a particular computer is limited by how much memory the computer has; the number of virtual addresses, on the other hand, is limited only by the number of bits in a virtual address. Thus, in a system that supports 32-bit addresses, the available virtual address space would be $2^{32}$ or 4 gigabytes, which generally is significantly greater than the available physical memory.

A virtual address space is a set of logical memory addresses available for a program to use. Typically, the virtual address space is divided into blocks of equal size called pages. Likewise, physical memory is divided into blocks called page frames, which are used to hold pages. Thus the virtual address space is divided up into units called "pages" which are translated or mapped into corresponding units or "page frames" in the physical memory. Pages and page frames always retain the same size, with a size of 4K being fairly typical.

For providing more virtual memory than is available physically, a scheme is required for swapping out pages. In a typical hardware implementation, virtual pages are tracked in a page table, with each entry in the table having a "present/absent" bit for indicating whether a particular page is mapped or not (i.e., present in physical memory). When a program tries to use an unmapped page, a "page fault" is trapped to the operating system. The operating system fetches the page just referenced into a page frame just freed (according to one of many possible algorithms), changes the map, and restarts the trapped instruction. Thus, using tables called page tables, the linear address undergoes a translation to a physical address.

In some systems, pages may also be provided with additional flags for controlling page protection. For example, a page may be set to read-only which will allow that page to be examined, but not written to. Controlling page-level protection can lead to more reliable programs by ensuring that a process does not accidentally write to pages that should be read-only, such as locations reserved for code. Any time a process attempts to access a memory page which it is not allowed access to, an exception occurs. As a result, execution of the program temporarily ceases while the operating system services the exception.

For a comprehensive introduction to memory management services of a multi-tasking operating system, such as Microsoft Windows NT, see Yao, P., *An Introduction to Windows NT Memory Management Fundamentals*, Microsoft System Journal, pp. 41–49, July–August 1992.

For further discussion of memory management, the reader may refer to, for example, U.S. Pat. Nos. 4,084,225 and 4,084,226. The disclosures of the foregoing references are incorporated herein by reference for all purposes.

The present invention exploits available memory management services, such as those available from the above-mentioned operating system, for circumventing the need to implement watchpointing with dedicated hardware debugging registers.

B. Watchpointing a Debuggee from a Debugger

1. Operation overview

Figure 3:
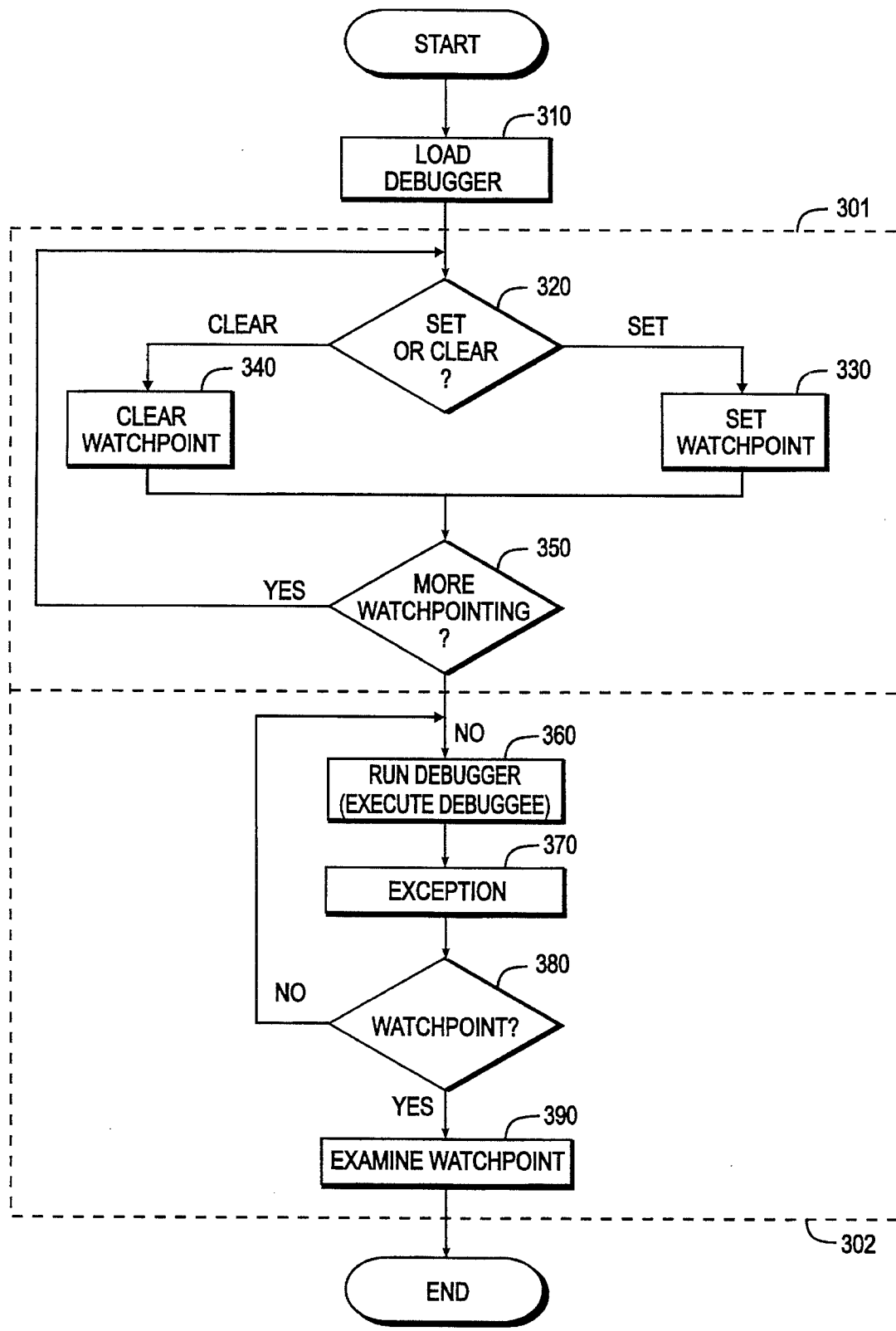
FIG. 3 is a flowchart illustrating the general method of the present invention for watchpointing.

FIG. 3 is a block diagram illustrating a general watchpointing process in accordance with the present invention. At step 310, the debugger 181 loads the debuggee into memory for debugging. Block 301 indicates high-level steps for setting or clearing watchpoints in the debugger. In particular, at step 320, the user instructs (via the GUI) the debugger to either set or clear a watchpoint. If the debugger is instructed to set a watchpoint, the debugger proceeds to set the watchpoint at step 330. On the other hand, if the user desires to clear a watchpoint, the debugger is instructed to proceed to step 340, where it clears a watchpoint. The user may set or clear more watchpoints by sending an appropriate message to the debugger at step 350. Upon receiving the user-generated message, the debugger loops back to step 320.

Once watchpoints are set, the user may instruct the debugger to execute the debuggee at step 360. At this point, the control of the system is transferred to the debuggee. However, when an exception occurs, the operating system transfers control back to the debugger. Block 302 generally describes the process employed by the debugger to determine whether the debuggee has reached a watchpoint after an exception has occurred.

At step 370, occurrence of an exception causes the operating system to transfer control back to the debugger. At step 380, the debugger analyzes the exception information that is generated by the operating system and/or hardware, such as information describing the address and cause of the exception. If the exception was caused by the debuggee encountering a watchpoint, the debugger proceeds to step 390 where the user may examine the particular watchpoint. However, if the exception was caused by reasons other than reaching a watchpoint, the process loops back to step 360 (e.g., to examine the cause of the exception).

2. Watchpointing a. Setting Watchpoints

Figure 4:
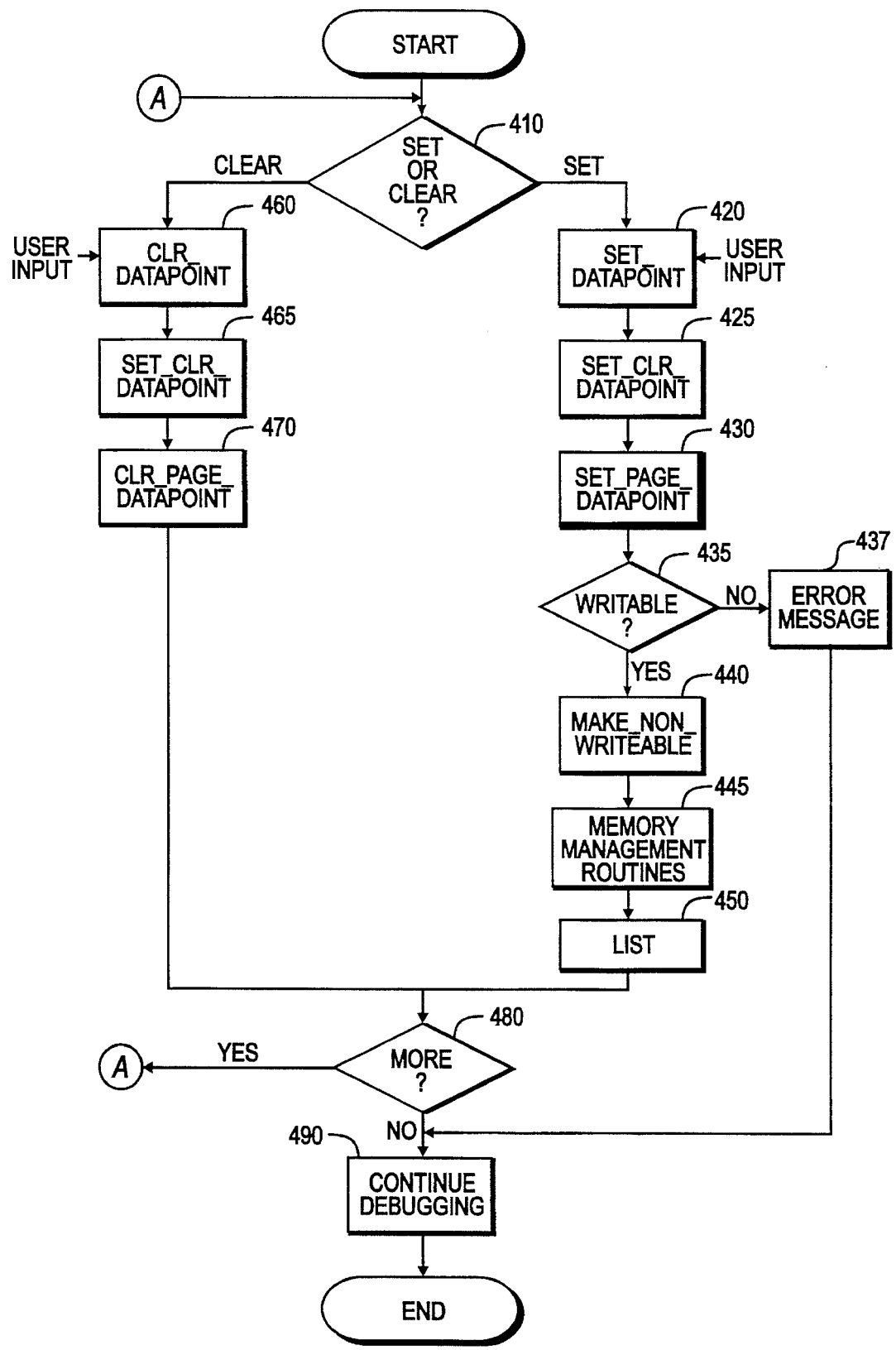
FIG. 4 is a flowchart illustrating in detail the operation of the method in FIG. 3 for setting and clearing watchpoints.

FIG. 4 illustrates the process for setting and clearing watchpoints as described in block 301 in greater detail. At step 410, the user sends a message to the debugger instructing it to either set or clear a watchpoint. If the user instructs the debugger to set a watchpoint, a function, named set_datapoint, is invoked by the debugger at step 420. The user specifies watchpointing information to the debugger, such as the address and size of the watchpoint (e.g., by using GUI technique for selecting from an available one). At step 425, set_datapoint passes the user-specified information to set_clr_datapoint, a function which identifies memory regions associated with the desired watchpoint.

Thereafter, at step 430, set_page_datapoint is invoked to set the protection in the memory regions that correspond to the watchpoint to no-access. At step 435, before the memory protection is set, set_page_datapoint invokes writable, a function which evaluates whether that region in memory is currently accessible. Typically, watchpoints are not permitted in non-accessible regions of memory since these regions are reserved for code, constants or the like.

If writable determines the memory region of interest is non-accessible, the debugger sends an error message to the user via the GUI at step 437. After receiving the error message, the user may re-initiate the watchpointing steps by sending the appropriate message to the debugger. However, if access to the memory region is permitted, writable returns the current protection bits of that memory region to set_page_datapoint. At step 440, set_page_datapoint in turn calls make_non_writable, a function to convert the set of protection bits to a set that indicates the memory region of interest is non-accessible.

At step 445, set_page_datapoint, upon receiving the converted protection bits from make_non_writable, invokes system memory management services to set the protection in the memory region of interest. At step 450, the watchpointing information is stored in a list. The list includes the address, the size, and the old protection state of the memory region associated with the watchpoint. At this point, a watchpoint has been successfully set. At step 480, the user may continue with setting another watchpoint by sending a message to the debugger instructing it to repeat the process beginning at step 410. Once watchpoint input is completed, the user may instruct the debugger to execute the debuggee at step 490.

b. Clearing Watchpoints

Referring back to step 410, if the user instructs the debugger to clear a watchpoint instead, a function named clr_datapoint is invoked. At step 460, clr_datapoint receives information from the user indicating the location and size of the watchpoint that is to be cleared. clr_datapoint, at step 465, calls set_clr_datapoint to identify the memory regions associated with the watchpoint. At step 470, set_clr_datapoint invokes a function, named clr_page_datapoint, to restore the protection bits in the specified watchpoint region to its original state and to remove the watchpoint from the list of watchpoints. In this manner, a watchpoint is cleared. At step 480, the user may instruct the debugger to clear another watchpoint, whereby steps 460–470 are repeated.

c. Exception Handling

Figure 5:
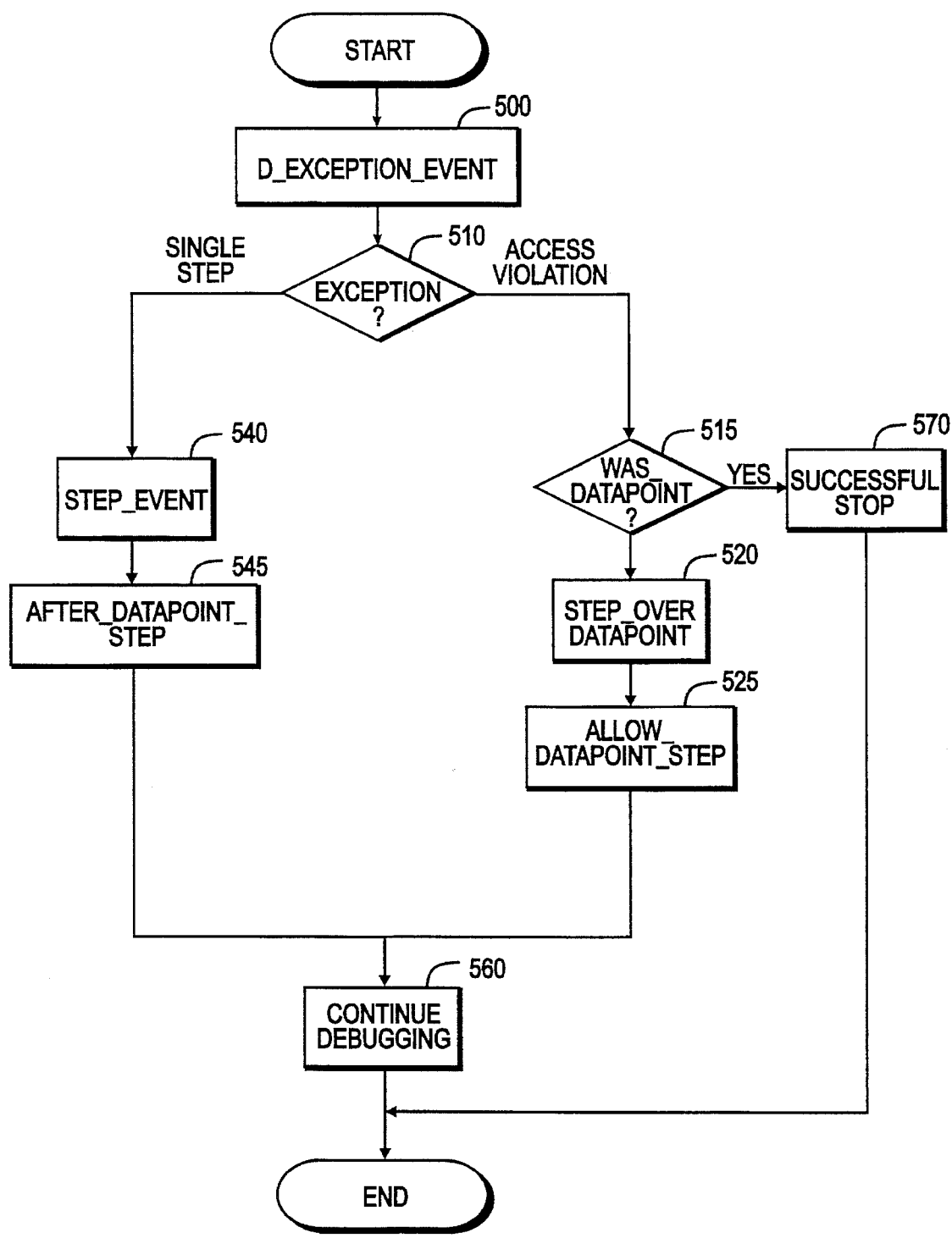
FIG. 5 is a flowchart illustrating in detail the operation of the interrupt handler in FIG. 3.

FIG. 5 illustrates block 302 of FIG. 3 in greater detail. While the debuggee is executing, the debugger is not in control of the system. However, once an exception occurs, the operating system transfers control to the debugger, specifically, to the debugger's exception handler. Further, as part of the operating system's standard exception handling mechanism, information pertaining to the exception is provided. Generally, the information includes the address and cause of the exception.

At step 500, d_exception_event is invoked by the operating system when an exception has occurred. d_exception_event retrieves the exception information from the operating system at step 510. If the exception was generated because the debuggee attempted to write to memory (i.e., access violation exception), the debugger proceeds to step 515. At step 515, d_exception_event invokes was_datapoint to evaluate whether the exception resulted from encountering a watchpoint. At step 570, the debugger returns a successful stop message to the user, via the GUI, if the exception was caused by reaching a watchpoint. Otherwise, at step 520, d_exception_event invokes step_over_datapoint for stepping over the instruction in the debuggee that caused the exception. This allows the debugger to continue debugging the debuggee until it encounters a watchpoint.

At step 525, step_over_datapoint calls allow_datapoint_step which unprotects the memory region that caused the exception. Upon returning from allow_datapoint_step, step_over_datapoint instructs the operating system to continue debugging at step 560, which, in this instance, is single stepping the debuggee. After the instruction in the debuggee has been stepped over, an exception is generated by the operating system.

The exception causes the debugger's exception handler to be invoked at step 500. At step 510, unlike previously, the debugger proceeds to step 540 and calls step_event because the exception originated from single stepping the debuggee. At step 545, step_event invokes memory management routines to re-protect the memory regions that were previously unprotected at step 525. Thereafter, the debugger instructs the operating system to continue debugging at step 560.

As shown, the debugger employs memory available management services of the operating system and hardware to set or clear watchpoints. Watchpoints are set or cleared by disallowing or allowing access to the specified memory regions, respectively. Thus, the debugger provides a system with an unlimited number of hardware watchpoints, despite such systems having a limited number of hardware debugging registers.

3. Exemplary Embodiment
a. Setting Watchpoints

The following will focus on methods for implementing watchpointing methods using a general purpose programming language, such as C programming language or its superset, C++. C and C++ programming languages are well documented in the trade, technical, and patent literature. See, for example, Ellis M. and Stroustrup B., *The Annotated C++ Reference Manual,* Addison-Wesley, 1990; the disclosure of which is hereby incorporated by reference. Suitable C/C++ compilers are available from several vendors, including Borland International of Scotts Valley, Calif., Microsoft Corp. of Redmond, Wash., and Symantec Corp. of Cupertino, Calif. Those skilled in the art, enabled by the teachings of the present invention, will appreciate that the methods of the present invention may be constructed in other development environments as well. Hence, the following is offered for purposes of illustration, not limitation.

In a preferred embodiment, watchpointing of the present invention is performed using memory management services provided by an operating system, such as IBM® OS/2 or Microsoft® Windows NT. To exploit the services of such operating systems, the present invention includes a group of watchpointing methods or functions embodied in C/C++ functions. Preferably, the functions are defined such that they belong to the same class. In an exemplary example provided herein, the functions belong to a C++ class, Dosi32.

Dosi32's class constructor defines the default values for variables used by the Dosi32 class functions. Thus, anytime a Dosi32 function is invoked, the values defined in the constructor will be used without requiring the programmer to supply the arguments. In an exemplary embodiment, the Dosi32 class constructor may be defined as follows:

```
Dosi32::Dosi32( )
{
   kid.num_protects=0;
   kid.num_datapoints=0;
   kid.which_datapoint=-1;
   kid.stepping_over_datapoint=0;
   kid.exception.instruction_address=ProcAddr(0UL);
   kid.exception.data_address=ProcAddr(0UL);
}
```

The above variables are used by the various C++ Dosi32 class functions and their purposes will later become apparent. The detailed construction of the Dosi32 watchpointing functions, as referenced in FIGS. 4–5, will now be described.

i. set_datapoint

As illustrated in FIG. 4, set_datapoint stores the address and the size of a watchpoint designated to be of interest to the user. These parameters are passed to other watchpointing functions for: a) determining whether watchpointing is allowed at the designated region or pages of memory; b) setting the protection at the relevant pages to no-access if watchpointing is permitted; and c) storing the designated watchpoint in a list comprising other watchpoints of interest.

In an exemplary embodiment, a set_datapoint function may be constructed as follows:

```
Dosi::DosiErrors
Dosi32::set_datapoint(ProcAddr address, int size)
{
   return set_clr_datapoint(DP_SET, address, size);
}
```

To set a watchpoint, the user instructs the debugger, via to the GUI, to instantiate set_datapoint for setting a watchpoint. The user-specified watchpoint parameters, address and size, are provided to set_datapoint. Address represents the base location of the watchpoint while size represents number of bytes or size of the memory region that the watchpoint encompasses. Next, set_datapoint transmits these parameters along with DP_SET to set_clr_datapoint. DP_SET informs set_clr_datapoint to set a watchpoint having the specified size at the specified address. Although the foregoing embodiment of set_datapoint sets one watchpoint at a time, the function may be readily modified to accept and set a plurality of user-specified watchpoints.

ii. set_clr_datapoint

According to the present invention, the set_clr_datapoint function preferably permits watchpointing of any size by protecting the appropriate pages in memory. In particular, watchpoints should not be limited by page boundaries or other restrictions presented by the operating system and/or platform hardware. In an exemplary embodiment, a set_clr_datapoint function may be constructed as follows:

```
Dosi::DosiErrors
Dosi32::set_clr_datapoint(e_set_clr  set, ProcAddr
   address, int size)
{
   //Set as many page-datapoints as are needed.
   long int offset=address.offset( );
   long int ps=page_size( );
   long int page_offset=offset % ps;
   long int remaining=ps-page_offset;
   //If span a boundary, protect the first page up to the
      edge. if(remaining<size)
   {
      if(set==DP_SET)
      {
         if(set_page_datapoint(address,   remaining)==
            Dosi_Failed) return Dosi_Failed;
      }
      else if(set==DP_CLR)
      {
         if(clr_page_datapoint(address,   remaining)==
            Dosi_Failed) return Dosi_Failed;
      }
      size -=remaining;
      address +=remaining;
   }
   //Protect as many full pages as there are left, and the last
      page
   //up to size % page_size.
   while(size>0)
   {
```

```
            remaining=size>ps?ps:size;
            if(set==DP_SET)
            {
                if(set_page_datapoint(address,    remaining)==
                    Dosi_Failed) return Dosi_Failed;
            }
            else if(set==DP_CLR)
            {
                if(clr_page_datapoint(address,    remaining)==
                    Dosi_Failed) return Dosi_Failed;
            }
            size -=ps;
            address +=ps;
        }
        return Dosi_Ok;
    }
```

As shown, set_clr_datapoint calls two functions: address.offset and page_size. address.offset takes any address and determines the number of bytes it is offset from the base of the segment. page_size determines the page size supported by memory management. Typically, this is four kilobytes (4K), but may vary depending on the particular hardware and/or software platform.

The two functions enable set_clr_datapoint to calculate the watchpoint's exact location and number of bytes contained within each page. Specifically, set_clr_datapoint splits partial and multiple page protection requests into a plurality of single page protection requests and calls set_page_datapoint function for setting the page protections. Thus, concerns which otherwise would prohibit watchpointing due to system limitations are eliminated.

In a simplified example, assume that a watchpoint of interest is 9K in length and starts at address 2K in a system that supports a 4K page size (i.e., the page boundaries are every 4K starting from address 0). In this instance, the watchpoint spans three pages. This includes part of the first page (from address 2K to 4K−1), all of the second page (from address 4K to 8K−1) and part of the third page (from address 8K to 11K−1).

When set_clr_datapoint is invoked, it determines from the address parameter the number of bytes the watchpoint is offset (2K) from the base of the page. Next, it derives the number of bytes to protect in the first page by taking the remainder (remaining) from dividing the offset by page_size (2K/4K). The remainder is 2K, which indicates that the first page is a partial page request (since remaining 2K is less then the page size of 4K). At this point, set_clr_datapoint passes address and remaining to set_page_datapoint which sets the protection accordingly. Thereafter, the address is incremented to point at the base of the next page and size is decreased by the amount of bytes contained in the first page.

Next, the remaining watchpoint region will be split into single page requests by the while (size>0) loop of set_clr_datapoint. The "while" loop calculates as many full pages as there are left and the last page up to the boundary of the watchpoint. For instance, in the first iteration of the while loop, set_clr_datapoint determines from size that the watchpoint touches the whole page. Accordingly, set_clr_datapoint passes address and remaining (indicating that the next request is a full page) to set_page_datapoint for setting the protection in the page referenced by address. Again, the address is incremented to point to the base of the subsequent page and size is decreased by the number of bytes protected in the page, which in this case is 4K.

On the next and final iteration of the while loop, set_clr_datapoint ascertains from size that the watchpoint encompasses the page partially, specifically, the first 3K. Accordingly, the appropriate information is passed to set_page_datapoint for protecting the first 3K of the page pointed to by address. At this point, the watchpoint is set. In this manner, the foregoing watchpointing method of the present invention supports watchpointing at any "grain" level irrespective of system limitations.

In an alternative embodiment, the concern for partial pages may be eliminated via assistance from linker 180. Specifically, the linker may be instructed to allocate a memory page (or segment) to each item for which the debuggee requests storage. In this manner, items of interest to the debugger are assigned their own page.

iii. set_page_datapoint

According to this specific embodiment of the invention, set_page_datapoint protects a region of memory as requested by set_clr_datapoint. As described above, the function supports an unlimited number of watchpoints at any "grain" level. Additional safeguards may be added to ensure that a watchpoint is set at pages allocated for data (e.g., using mapping information provided by the linker). In an exemplary embodiment, a set_page_datapoint function or method may be constructed as follows:

```
Dosi::DosiErrors
Dosi32::set_page_datapoint(ProcAddr address, int size)
{
    LPVOID addr=address;
    MEMORY_BASIC_INFORMATION m;
        if(VirtualQueryEx(kid.hProcess, addr, &m, sizeof(m)))
        {
            if(writable(m.Protect)!=IS_WRITABLE) return
                Dosi_Failed;
        }
        else
            return Dosi_Failed;
    DWORD s=size;
    DWORD p=make_non_writable(m.Protect);
    DWORD o;
        if(VirtualProtectEx(kid.hProcess, addr, s, p, &o))
        {
            kid.datapoint_list[kid.num_datapoints].address=
                addr;
            kid.datapoint_list[kid.num_datapoints].size=s;
            kid.datapoint_list[kid.num_datapoints].protect=o;
            kid.num_datapoints++;
            return Dosi_Ok;
        }
    return Dosi_Failed;
}
```

As shown, set_page_datapoint calls VirtualQueryEx, a standard Win32 API call, provides information about a range of pages within the virtual address space of the specified process. VirtualQueryEx is defined to have the following API interface (function prototype):

DWORD    VirtualQueryEx(hProcess,    lpvAddress, pmbiBuffer, cbLength)
    HANDLE hProcess; //handle of the process
    LPCVOID lpvAddress; //address of region
    PMEMORY_BASIC_INFORMATION pmbiBuffer;
    //address of info buffer
    DWORD cbLength; //size of buffer hProcess, a member of type HANDLE (integer data type in Windows), identifies the child process whose memory information is queried. lpvAddress, a member of type LPCVOID (const void FAR* data type in Windows), points to the base address of the region of pages to be queried. This value is rounded down to the next page boundary. pmbiBuffer points to a MEMORY_BASIC_INFORMATION structure (described below) in which information about the specified page range is returned. cbLength, a member of type DWORD (unsigned long data type in Windows), specifies the size, in bytes, of the buffer pointed to by the pmbiBuffer parameter. VirtualQueryEx returns an unsigned long or DWORD specifying the actual number of bytes returned in the information buffer.

VirtualQueryEx determines the attributes of the first page in the region and then scans subsequent pages until it scans the entire range of pages, or until it encounters a page with a nonmatching set of attributes. The function returns the attributes and the size, in bytes, of the region of pages with matching attributes. Additional description of VirtualQueryEx is available in the Microsoft Win32 API SDK materials (available from Microsoft and other vendors).

set_page_datapoint employs VirtualQueryEx to retrieve information about a block of memory within the virtual address space of the debuggee (kid.hProcess). VirtualQueryEx determines the state of the first page within the region specified by addr and then subsequent entries in the process address map are scanned from the base address (addr) upward until either the entire range of pages has been scanned or until a page with a nonmatching set of attributes is encountered.

set_page_datapoint passes (by reference) to VirtualQueryEx a data member, m, of type MEMORY_BASIC_INFORMATION. MEMORY_BASIC_INFORMATION contains information about a range of pages in the process's virtual address space and is a standard Win32 data structure defined as follows:

```
typedef struct _MEMORY_BASIC_INFORMATION { // mbi
    PVOID BaseAddress;          // base address of region
    PVOID AllocationBase;       // allocation base address
    DWORD AllocationProtect;    // initial access protection
    DWORD RegionSize;           // size, in bytes, of region
    DWORD State;                // committed, reserved, free
    DWORD Protect;              // current access protection
    DWORD Type;                 // type of pages
} MEMORY_BASIC_INFORMATION;
```

Of particular interest is the Protect member, which is an unsigned long or DWORD specifying the access protection of the pages in the region. One of the following flags is specified, along with PAGE_GUARD and PAGE_NOCACHE protection modifier flags:

| Value | Meaning |
|---|---|
| PAGE_READONLY | Enables read access to the committed region of pages. An attempt to write to the committed region results in an access violation. If the system differentiates between read-only access and execution access, an attempt to execute code in the committed region results in an access violation. |
| PAGE_READWRITE | Enables both read and write access to the committed region of pages. |
| PAGE_WRITECOPY | Gives copy-on-write access to the committed region of pages. |
| PAGE_EXECUTE | Enables execute access to the committed region of pages. An attempt to read or write to the committed region results in an access violation. |
| PAGE_EXECUTE_READ | Enables execute and read access to the committed region of pages. An attempt to write the committed region results in an access violation. |
| PAGE_EXECUTE_READWRITE | Enables execute, read, and write access to the committed region of pages. |
| PAGE_EXECUTE_WRITECOPY | Enables execute, read, and write access to the committed region of pages. The pages are shared read-on/copy-on-write. |
| PAGE_GUARD | Protects the page with the underlying page protection. However, access to the region causes a "guard page entered" condition to be raised in the subject process. This value is a page protection modifier, only valid when used with one of the page protections other than PAGE_NOACCESS. |
| PAGE_NOACCESS | Disables all access to the committed region of pages. An attempt to read from, write to, or execute in the committed region results in an access violation exception, called a general protection (GP) fault. |
| PAGE_NOCACHE | No caching of the committed regions of pages is allowed. The hardware attributes for the physical memory should be set to no cache. Although not recommended for general usage, it is useful for device drivers and the like. This value is a page protection modifier, and is only valid when used with one of the page protections other than PAGE_NOACCESS. |

The m. Protect value returned by VirtualQueryEx is passed to writable for determining whether the region is "writable."

In an exemplary embodiment, writable is implemented using a case statement which compares the passed-in protection (m.Protect) against the above system-defined page protection states:

```
Dosi32::e_writable
Dosi32::writable( DWORD d )
{
    switch( d & ~(PAGE_GUARD | PAGE_NOCACHE) )
    {
        case PAGE_NOACCESS:              return NOT_WRITABLE;
        case PAGE_READONLY:              return NOT_WRITABLE;
        case PAGE_EXECUTE:               return NOT_WRITABLE;
        case PAGE_EXECUTE_READ:          return NOT_WRITABLE;
        case PAGE_EXECUTE_READWRITE:     return IS_WRITABLE;
        case PAGE_EXECUTE_WRITECOPY:     return IS_WRITABLE;
        case PAGE_READWRITE:             return IS_WRITABLE;
        case PAGE_WRITECOPY:             return IS_WRITABLE;
    }
    return MAYBE_WRITABLE;
}
```

If the protection mode is writable (i.e., PAGE_EXECUTE_READWRITE, PAGE_EXECUTE_WRITECOPY, PAGE_READWRITE or PAGE_WRITECOPY), the function returns IS_WRITABLE to set_page_datapoint. On the other hand, if the protection bits indicate that the memory page is not writable (PAGE_NOACCESS, PAGE_READONLY, PAGE_EXECUTE or PAGE_EXECUTE_READ), writable returns NOT_WRITABLE. Optionally, the function may return MAYBE_WRITABLE in undefined cases.

Upon returning a value other than IS_WRITABLE, set_page_datapoint notifies the user of an error since watchpoints are allowed only at pages that are writable. However, if IS_WRITABLE is returned, set_page_datapoint calls make_non_writable for updating the protection bits to non-writable. In an exemplary embodiment, a make_non_writable function may be created as follows:

```
DWORD
Dosi32::make_non_writable(DWORD d)
{
    DWORD simple=d & ~(PAGE_GUARD|PAGE_NOCACHE);
    DWORD extra=d & (PAGE_GUARD|PAGE_NOCACHE);
    switch(simple)
    {
        case PAGE_NOACCESS:
        case PAGE_READONLY:
        case PAGE_EXECUTE:
        case PAGE_EXECUTE_READ:
            return d;
        case PAGE_EXECUTE_READWRITE:
            return extra|PAGE_EXECUTE_READ;
        case PAGE_EXECUTE_WRITECOPY:
            return extra|PAGE_EXECUTE;
        case PAGE_READWRITE:
            return extra|PAGE_READONLY;
        case PAGE_WRITECOPY:
            return extra|PAGE_NOACCESS;
    }
    return 0;
}
```

As illustrated, make_non_writable takes the protection bits (m.Protect) and transforms them into a non-writable (PAGE_NOACCESS) value.

set_page_datapoint, thereafter, invokes the VirtualProtectEx API call for setting the protection in a region of the debuggee's virtual memory (kid.hProcess). In particular, the page pointed to by addr is converted to non-writable (PAGE_NOACCESS). Further, addr, s (size of the region in the page referenced by addr) and o (the old page protection bits) are stored in a list or other storage mechanism. In this manner, the present invention defines unlimited number of watchpoints of any size.

In this fashion, the set_page_datapoint method of the present invention supports protecting unlimited number of memory regions of any size. Further, the pages are examined to ensure that watchpoints are not set in pages which are not writable.

b. Clearing Watchpoints
i. clr_datapoint

As shown in FIG. 4, the method of clearing a watchpoint begins with the clr_datapoint function, which receives the address and the size of a particular watchpoint that is to be cleared. These are passed as parameters to other clearing watchpoint functions (referenced in FIG. 4) for resetting the protection mode in the memory region associated with the watchpoint.

To clear a watchpoint, the user instructs the debugger, via the GUI, to instantiate clr_datapoint. The user then specifies the watchpoint parameters, address and size, to the debugger via the GUI. Address represents the base location of the watchpoint while size represents number of bytes or size of the memory region that the watchpoint encompasses. In an exemplary embodiment, a clr_datapoint function may be constructed as follows:

```
Dosi32::clr_datapoint(ProcAddr address, int size)
{
    return set_clr_datapoint(DP_CLR, address, size);
}
```

As shown, clr_datapoint passes address and size along with DP_CLR as arguments to set_clr_datapoint. The DP_CLR or "data point clear" flag informs set_clr_datapoint to "clear" a watchpoint at the specified address having the specified size. In an exemplary embodiment, clr_datapoint clears one watchpoint at a time. However, it will be understood that one skill in the art could easily modify clr_datapoint to clear a plurality of watchpoints.

In turn, set_clr_datapoint (which has already been described with respect to setting a watchpoint) converts the partial and multiple page de-protection requests into single page requests, which are handled by clr_page_datapoint. In an exemplary embodiment, clr_page_datapoint may be constructed as follows:

```
Dosi32::clr_page_datapoint(ProcAddr address, int size)
{
    LPVOID addr=address;
    int had_one=0;
    for(int i=0; i<kid.num_datapoints; i++)
    {
```

```
        LPVOID a=kid.datapoint_list[i].address;
        DWORD p=kid.datapoint_list[i].protect;
        DWORD s=kid.datapoint_list[i].size;
        DWORD o;
        if(a!!p!!s)
            had_one++;
        if(a==addr && s==size)
        {
            if(VirtualProtectEx(kid.hProcess, a, s, p, &o))
            {
                kid.datapoint_list[i].address=0;
                kid.datapoint_list[i].protect=0;
                kid.datapoint_list[i].size=0;
                return Dosi_Ok;
            }
        }
    }
    if(had_one==0)
        kid.num_datapoints=0;
    if(kid.num_datapoints==0)
        kid.stepping_over_datapoint=0;
    return Dosi_Failed;
}
```

As shown, clr_page_datapoint compares the address and size parameters with the list of watchpoints (kid.datapoint_list[ ]) created by set_page_datapoint. If there is a match, clr_page_datapoint invokes VirtualProtectEx for restoring the page protection to its original state (which has been previously stored in the list). Thereafter, clr_page_datapoint clears the entry from the list of data points.

c. Exception Handler

As shown in FIG. 5, the debugger's exception handler, d_exception_event, gains control when an exception is generated by the system (i.e., step 370 of FIG. 3). d_exception_event identifies the cause of the exception. Causes include, for example, attempting to illegally access protected memory regions, single stepping a debuggee, and the like. If the exception was caused by the debuggee encountering a watchpoint, the debugger may perform debugging functions, such as inspecting or changing data in memory or other services provided by the debugger. If no watchpoint was encountered, on the other hand, the debugger returns control to the debuggee until it "hits" a watchpoint.

In an exemplary embodiment, a d_exception_event method may be constructed as follows:

```
void
Dosi32::d_exception_event(EXCEPTION_DEBUG_
    INFO *info)
{
    DWORD code=info->ExceptionRecord.ExceptionCode;
    kid.exception.instruction address=info->ExceptionRecord.ExceptionAddress;
    kid.exception.ex_type=ET_UNKNOWN;
    if(code==EXCEPTION_SINGLE_STEP)
    {
        step_event( );
        return;
    }
    DWORD waswrt;
    unsigned long da;
    kid.exception.data_address=ProcAddr(0UL);
    if(code==EXCEPTION_ACCESS_VIOLATION)
    {
        kid.exception.ex_type=ET_ACCESS_VIOLATION;
        waswrt=info->ExceptionRecord.ExceptionInformation[0];
        da=info->ExceptionRecord.ExceptionInformation[1];
        kid.exception.data address=ProcAddr(da);
        kid.exception.was_write=waswrt ? WAS_WRITE:WAS_READ;
        if(waswrt)
        {
            e_datapoints ed=was_datapoint(da);
            if(ed==WAS_A_DATAPOINT)
            {
                send_to_UI(E_DATAPOINT);
                return;
            }
            else if(ed==NOT_A_DATAPOINT)
            {
                step_over_datapoint( );
                ContinueDebuggee( );
                return;
            }
        }
    }
}
```

As shown, d_exception_event is passed a pointer to info, a data member of type EXCEPTION_DEBUG_INFO. The EXCEPTION_DEBUG_INFO structure, which contains exception information for use by the debugger, is a standard Windows data structure defined as:

```
typedef struct _EXCEPTION_DEBUG_INFO {
    EXCEPTION_RECORD ExceptionRecord;
    DWORD dwFirstChance;
}EXCEPTION_DEBUG_INFO;
```

As shown, it includes another Windows data structure—EXCEPTION_RECORD—which specifies exception information:

```
typedef struct _EXCEPTION_RECORD {
    DWORD ExceptionCode; //specifies an exception code
    DWORD ExceptionFlags;
    struct _EXCEPTION_RECORD _ss *ExceptionRecord;
    LPVOID ExceptionAddress; //specifies an exception address
    UINT NumberParameters;
    DWORD ExceptionInformation[EXCEPTION_MAXIMUM_PARAMETERS];
}EXCEPTION_RECORD;
```

Of particular interest to d_exception_event are ExceptionCode and ExceptionAddress which specify the reason and location where the exception occurred, respectively. In a typical operating system, there are many types of exceptions, for example, data overflow, access violation, stack overflow, stack underflow and divide by zero, just to name a few. Here, the debugger of the present invention is primarily concerned with two: access violation and single step. These are identified by the exception code constants of EXCEPTION_ACCESS_VIOLATION and EXCEPTION_SINGLE_STEP, respectively. Although these types of exceptions are of immediate interest in a preferred embodiment, an alternative embodiment may test other exception types and instruct the debugger appropriately.

In the foregoing manner, the d_exception_event method permits the debugger to identify the cause and location of the exception. Using this information, the system may determine if the exception occurred within a watchpoint, as will now be described.

i. Access Violation Exception

For an exception of type EXCEPTION_ACCESS_VIOLATION, d_exception_event invokes a was_datapoint function to determine if the exception occurred within one of the defined watchpoints. In an exemplary embodiment, was_datapoint may be constructed as follows:

```
Dosi32::e_datapoints
Dosi32::was_datapoint(DWORD da)
{
    kid.which_datapoint=-1;
    if(kid.num_datapoints==0)
        return NO_DATAPOINTS;
    for(int i=0; i<kid.num_datapoints; i++)
    {
        DWORD    a=DWORD(kid.datapoint_list[i].address);
        DWORD s=DWORD(kid.datapoint_list[i].size);
        if(a>=da && a<da+s)
            kid.which_datapoint=i;
            return WAS_A_DATAPOINT;
    }
    return NOT_A_DATAPOINT;
}
```

As exemplified, was_datapoint takes the address of the exception (ExceptionAddress) and compares it with the list of watchpoints in kid.datapoint_list. If the address is within the range of addresses stored in the list, was_datapoint returns WAS_A_DATAPOINT to d_exception_event. Thereafter, d_exception_event notifies the user, through the user interface, that the debuggee has successfully stopped at a watchpoint.

On the other hand, if the address is not within the list of watchpoints, was_datapoint returns NOT_A_DATAPOINT. Upon receiving NOT_A_DATAPOINT, d_exception_event calls step_over_datapoint, for instructing the operating system to step over the statement that produced the exception. step_over_datapoint may be constructed as follows:

```
void
Dosi32::step_over_datapoint(void)
{
    kid.stepping_over_datapoint=1;
    allow_datapoint_step( );
    set_single_stepping(1);
```

Before stepping over the statement that caused the exception, the debugger un-protects the memory page which the debuggee attempted to access. To accomplish this, step_over_datapoint invokes allow_datapoint_step which may be constructed as follows:

```
Dosi32::allow_datapoint_step(void)
{
    MEMORY_BASIC_INFORMATION m;
    LPVOID    a=LPVOID(kid.exception.data_address.offset( ));
    if(VirtualQueryEx(kid.hProcess, a, &m, sizeof(m)))
        if(writable(m.Protect)!=NOT_WRITABLE)
            return;
    }
    else
        return;
    DWORD p=make_writable(m.Protect);
    DWORD o;
    VirtualProtectEx(kid.hProcess, a, 1, p, &o);
}
```

As embodied, allow_datapoint_step invokes the VirtualQueryEx API call for retrieving information pertaining to the page of interest, particularly the protection. The protection state (m.Protect) is passed to the previously-described writable for analysis. If the protection state of the memory page is no-access (PAGE_NOACCESS), allow_datapoint_step calls VirtualProtectEx to unprotect the page. Thereafter, step_over_datapoint instructs the operating system to execute a single statement in the debuggee by setting the single step flag.

ii. Single Step Exception

After the processor has single stepped an instruction in the debuggee, a single step exception occurs. As a result, d_exception_event invokes step_event to clear the single step flag. In an exemplary embodiment, a step_event function may be constructed as follows:

```
void
Dosi32::step_event(void)
{
    if(kid.stepping_over_datapoint && kid.num_datapoints)
    {
        after_datapoint step( );
        kid.stepping_over_datapoint=0;
        set_single_stepping(0);
        ContinueDebuggee( );
    }
}
```

As illustrated, step_event calls after_data_point to restore the memory to the state prior to single stepping (PAGE_NOACCESS). In an exemplary embodiment, after_datapoint_step may be created as follows:

```
void
Dosi32::after_datapoint_step(void)
{
    MEMORY_BASIC_INFORMATION m;
    LPVOID    a=LPVOID(kid.exception.data_address.offset( ));
    if(VirtualQueryEx(kid.hProcess, a, &m, sizeof(m)))
    {
        if(writable(m.Protect)!=IS_WRITABLE)
            return;
    }
    else
        return;
    DWORD p=make_non_writable(m.Protect);
    DWORD o;
    VirtualProtectEx(kid.hProcess, a, 1, p, &o);
}
```

In this embodiment, after_datapoint_step invokes VirtualQueryEx to retrieve information from the memory region of interest. This task is performed in a manner similar to that in the allow_datapoint_step function described above. The step is (optionally) provided to ensure the protection in the page of interest is IS_WRITABLE, before protecting it. Next, after_data_point calls previously-described make_non_writable to convert the page protection of interest to PAGE_NOACCESS. After the page is reprotected, a step_event method is employed for clearing the single step flag and instructs operating system to continue debugging.

C. Stopping a Debuggee

1. Introduction

According to another aspect of the invention, methods for stopping a debuggee are provided. In particular, the methods eliminate the need for a debugger to loop through all the threads of a debuggee to instruct each one to stop executing.

Instead, the present invention relies on memory management facilities of the operating system to disallow access to all executable regions of the debuggee's memory. In this manner, a debugger can quickly stop a debuggee and its threads by generating an exception when they attempt to access the protected regions.

Figure 6:
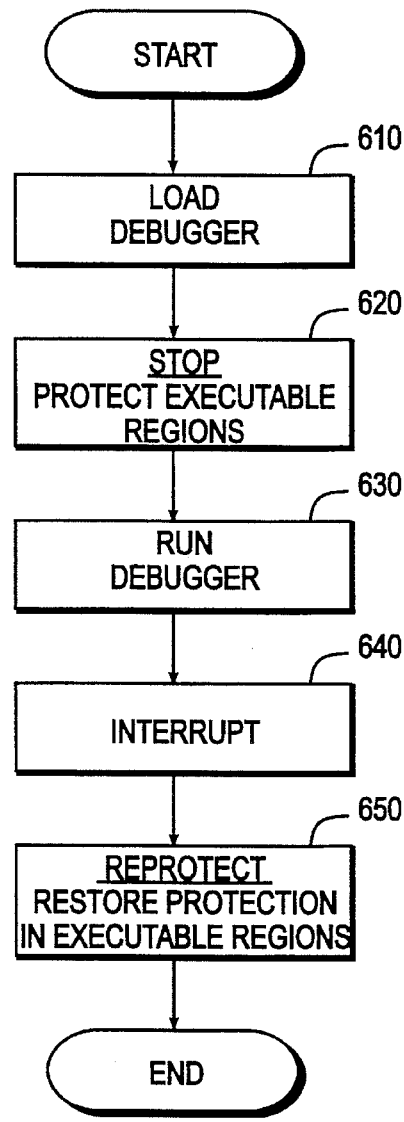
FIG. 6 is a flowchart illustrating in general a method of the present invention for stopping a debuggee.

FIG. 6 illustrates a general process for stopping a debuggee. At step 610, the debugger loads the debuggee into memory for execution. At step 620, the debugger finds all the executable regions of the debuggee by using operating system memory management facilities. The debugger then sets the protection mode in these regions to no-access and then tracks corresponding address ranges and their initial memory protection states.

At step 630, the user instructs the debugger to execute the debuggee. An interrupt occurs when the debuggee attempts to access any of the protected pages in memory. At step 640, the interrupt causes the operating system to stop the debuggee and its threads and to transfer control to the debugger. At step 650, the user instructs the debugger to restore the debuggee's executable regions to their original protection state. Thereafter, the user may instruct the debugger to execute the debuggee.

2. Exemplary Embodiment

In a preferred embodiment, functions for stopping a debuggee use memory management facilities provided by the operating system. In Windows NT, for instance, a region of memory may be characterized as EXECUTABLE by ORing (bitwise OR operation) the following PAGE_ bit flags:

```
const int EXECUTABLE=PAGE_EXECUTE|PAGE_
    EXECUTE_READ|PAGE_EXECUTE_
    READWRITE|PAGE_EXECUTE_WRITECOPY;
```

A list of executable region may be constructed by:

```
const int MAX_PROTECT_REGIONS=4096;
struct
{
    LPVOID address;
    DWORD protect;
    DWORD size;
}protect_list[MAX_EXEC_REGIONS];
``` where address specifies the address, protect specifies the protection bits, and size specifies size. Those skilled in the art will appreciate that the information may be tracked in other list or collection data structures.

a. stop

To implement step 620 in FIG. 6, a stop function is employed. stop finds all executable regions in memory belonging to the debuggee and sets the protection in these regions to no-access. In addition, stop stores the location, size and old protection state in protect_list.

In an exemplary embodiment, stop may be constructed as follows:

```
void
stop(void)
{
    MEMORY_BASIC_INFORMATION m;
    char *a=0;
    while(VirtualQueryEx(hProcess, a, &m, sizeof(m)))
    {
        if(m.Protect & EXECUTABLE)
        {
            LPVOID addr=m.BaseAddress;
            DWORD       p=(m.Protect
                ~(EXECUTABLE))|PAGE_NOACCESS;
            DWORD s=m.RegionSize;
            DWORD o;
            if(VirtualProtectEx(hProcess, addr, s, p, &o))
            {
                protect_list[num_protects].address=addr;
                protect_list[num_protects].size=s;
                protect_list[num_protects].protect=o;
                if(num_protects++>=MAX_EXEC_RE-
                    GIONS)
                    break;
            }
        }
        a +=m.RegionSize;
    }
    PostThreadMessage(thread, 0, 0, 0);
}
```

As shown, the stop routine employs the VirtualQueryEx API call to find all executable regions in the debuggee's memory. As previously discussed, VirtualQueryEx returns information characterizing a block of memory. Starting at address 0, stop loops through all memory regions by adding the size of the region to the last address used to get the next address. The loop ends when an address requested is out of range (i.e., exceeds the available virtual memory).

With each iteration through the loop, the protection bits corresponding to each address are examined. Any page whose protection bits do not represent an executable region are ignored by the debugger. Next, the debugger sets the protection mode in each executable page to PAGE_NOACCESS, again using the VirtualProtectEx API call. At this point, if the debuggee accesses a protected page of memory, an access violation will occur, thereby stopping the debuggee and its threads.

In some situations, the debuggee may be blocked because it is waiting for a message from the operating system. As a result, the debuggee may not have an opportunity to generate an interrupt by accessing a protected region of memory. This problem may be resolved by sending a NULL message to the debuggee via the PostThreadMessage API call. Upon receiving the NULL message, the debuggee is unblocked and allowed to continue.

b. reprotect

When the debugger is ready to restart the debuggee, reprotect is called to reset the executable regions to their original protection state (which, recall, was saved in protect_list). In an exemplary embodiment, reprotect may be constructed as follows:

```
void
reprotect(void)
{
    for(int i=0; i<num_protects; i++)
    {
        LPVOID a=protect_list[i].address;
        DWORD p=protect_list[i].protect;
        DWORD s=protect_list[i].size;
        DWORD o;
        VirtualProtectEx(hProcess, a, s, p, &o);
    }
    num_protects=0;
}
```

As exemplified, reprotect examines protect_list[ ] to retrieve the address, original protection and size associated with each executable region of memory. The information is then passed to VirtualProtectEx which, as described above, sets the protection bits according to the arguments received. In this instance, the protection bits in the executable regions are reset to their original state (dictated by a, p, and s). When this step is finished, the method is done, the user may instruct the debugger to continue debugging.

D. Statement Stepping a Debuggee

1. Introduction

In yet another aspect of the invention, methods for statement stepping in a debuggee from a debugger are provided. In particular, the methods allow for stepping statements containing subroutine calls, which may or may not contain debugging information, without the need for single stepping each statement in the routine. Instead, the methods exploit standard memory management services for allowing and disallowing access into memory regions containing debugging information. In this manner, the debugger can quickly and accurately step over statements in subroutines and stop only at those statements having debugging information.

Figure 7:
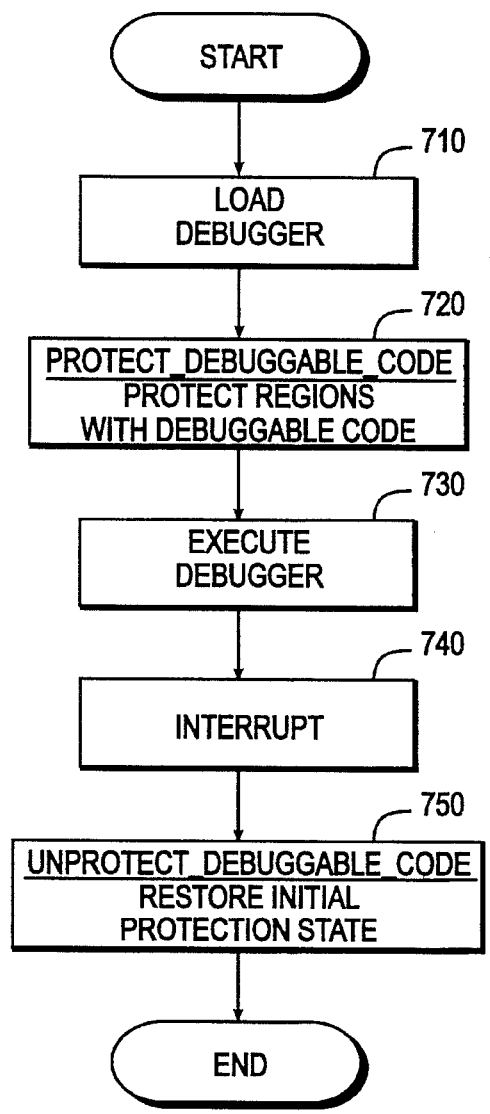
FIG. 7 is a flowchart illustrating in general a method of the present invention for statement stepping a debuggee.

FIG. 7 illustrates a general overview of the statement stepping process. At step 710, the debugger loads the debuggee into memory. At step 720, the debugger examines memory and identifies all regions that contain debugging information. The protection bits associated with these memory regions are then set to no-access. Each region's address range and initial protection state are recorded.

At step 730, the debugger is instructed to execute the debuggee. When the debuggee attempts to access any of the memory pages that are protected at step 740, an interrupt is generated. The interrupt causes the operating system to stop the debuggee and transfer control to the debugger. Next, the debugger informs the user that a region with debugging information has been encountered. At step 750, the debugger restores the memory regions to their original protection state and restarts the debuggee.

2. Exemplary Embodiment

In a preferred embodiment, functions for statement stepping utilize memory management facilities provided by the operating system. The statement stepping functions access address, size and original protection bits of the memory pages, which are characterized by a system-maintained data structure.

Similar to protect_list[ ], a list of debuggable regions, debuggable_list[ ], may be created:

```
const int MAX_PROTECT_REGIONS=4096;
extern struct
{
  LPVOID address;
  DWORD protect;
  DWORD size;
} debuggable_list[MAX_EXEC_REGIONS];
```

As shown, the content of the data structure debuggable_list[MAX_EXEC_REGIONS] represents a list of regions in memory that contains debugging information. This list describes the address and size as well the protection bits for each region. In addition, a variable, num_debuggable, may be defined for tracking the number of regions in debuggable_list[ ]:

extern int num_debuggable;

As previously described, address is a far pointer (Windows LPVOID type) to an address, and protect is an unsigned long integer or "double word" (Windows DWORD) for storing the protection bits. The variable hProcess is a handle to a debuggee which is being debugged. Although the debuggable_list[ ] is declared as a fixed-size array, other list or collection data structures may be employed.

debuggable_list[ ] may be filled by employing a method similar to that used for forming protect_list[ ] in the previously-described stop function. For example, regions in memory having debug information may be identified by using debug information in the executable (.exe) file. The information derived from VirtualQueryEx may be stored in debuggable_list[ ], which is available for use by two routines, protect_debuggable_code and unprotect_debuggable_code, which will now be described.

a. protect_debuggable_code

The debugger invokes protect_debuggable_code to implement step 720 of FIG. 7. When invoked, protect_debuggable_code sets the protection mode to no-access in regions specified in debuggable_list[ ]. In an exemplary embodiment, protect_debuggable_code may be constructed as follows:

```
void
protect_debuggable_code(void)
{
  for(int i=0; i<num_debuggable; i++)
  {
    LPVOID a=debuggable_list[i].address;
    DWORD p=PAGE_NOACCESS;
    DWORD s=debuggable_list[i].size;
    DWORD o;
    if(VirtualProtectEx(hProcess, a, s, p, &o))
      debuggable_list[i].protect=o;
  }
}
```

As shown, protect_debuggable code loops through all the entries in debuggable_list to identify the memory regions of interest. The function calls VirtualProtectEx to set the protection bits in the these regions to PAGE_NOACCESS. The old access permission bits are then returned and stored in debuggable_list. Now, when the debuggee encounters a statement having debugging information an exception occurs, with the system transferring control to the debugger.

b. unprotect_debuggable_code

When the debugger is ready to restart the debuggee, it calls unprotect_debuggable_code to restore the original page protection. When called, unprotect_debuggable_code examines debuggable_list to identify the regions with debugging information and restore them to their original protection state. In an exemplary embodiment, protect_debuggable_code may be constructed as follows:

```
void
unprotect_debuggable_code(void)
{
  for(int i=0; i<num_debuggable; i++)
  {
    LPVOID a=debuggable_list[i].address;
    DWORD p=debuggable_list[i].protect;
    DWORD s=debuggable_list[i].size;
    DWORD o;
    VirtualProtectEx(hProcess, a, s, p, &o);
  }
}
```

As exemplified, unprotect_debuggable_code ascertains the address, original protection bits and size of each region having debugging information from the debuggable_list. These parameters are then passed to VirtualProtectEx, which resets the protection bits in the regions to their original state (instructed by a, p, and s). When this step is finished, the method is done, the user may instruct the debugger to continue debugging.

While the various aspects of the invention are described in some detail with specific reference to a single preferred embodiment and certain alternatives, there is no intent to limit the invention to that particular embodiment or those specific alternatives. Thus, the true scope of the present invention is not limited to any one of the foregoing exemplary embodiments but is instead defined by the following claims.

What is claimed is:

1. In a system for executing a program on a computer, said computer comprising memory for storing said program and having a memory access protection mechanism for allowing and disallowing access to regions of memory, an improved method for stopping execution of the program upon access of a particular data member of the program which is of interest to a user, the method comprising:

(a) loading said program into said memory for execution by the computer, wherein the particular data member is stored in a particular region of said memory to which access is allowed;

(b) receiving a request from the user for setting a watchpoint for the particular data member, said watchpoint request instructing the computer to stop execution of the program upon attempted access to the particular region of memory storing said particular data member;

(c) in response to said watchpoint, storing a memory address and size for indicating where the particular region of memory stores said particular data member and setting an associated protection state which specifies that said memory access protection mechanism is to disallow an attempt to access the particular region of memory storing the particular data member;

(d) executing the program until an attempt is made to access the particular region of memory;

(e) upon an attempt to access the particular region of memory, determining from said stored memory address and size whether said attempt to access is an attempt to access said particular data member of the watchpoint; and (f) if said attempt to access is an attempt to access said particular data member of the watchpoint, stopping execution of the program.

2. The method of claim 1, further comprising:

providing notification to the user if said program has reached the watchpoint.

3. The method of claim 2, wherein said notification includes information characterizing a current state for the particular data member.

4. The method of claim 3, wherein said information characterizing a current state for the particular data member comprises a value stored by the particular data member.

5. The method of claim 1, further comprising:

clearing the watchpoint by setting a protection state which specifies that said memory access protection mechanism is to allow access to the particular region of memory storing the particular data member.

6. The method of claim 1, further comprising:

clearing said watchpoint, by invoking operating system memory management functions to restore particular region of memory its original protection state.

7. The method of claim 1, further comprising:

repeating steps (b) and (c) for setting a plurality of watchpoints.

8. In a system for finding and eliminating errors in a debuggee program executable by a computer, said computer comprising memory for storing said debuggee, a method for stopping execution of said debuggee upon access to a plurality of debuggee watchpoints, the method comprising the steps of:

(a) storing a base address and size corresponding to each of said debuggee watchpoints;

(b) disallowing access to regions in said memory associated with said watchpoints;

(c) upon an attempted access to regions in said memory associated with said watchpoints, determining based on said stored base address and size for each of said debuggee watchpoints whether said attempted access is an attempted access to one of said debuggee watchpoints; and (d) in response to step (c), stopping said debuggee when said debuggee has attempted to access one of said debuggee watchpoints.

9. The method of claim 8 further comprising the step of providing notification if said debuggee has reached a watchpoint.

10. The method of claim 8 wherein said system invokes operating system memory management functions to retrieve memory information.

11. The method of claim 8 further comprising the step of clearing at least one of said watchpoints, said clearing step further comprising the step of invoking operating system memory management functions to restore said memory region to its original protection state.

12. The method of claim 11 wherein the clearing step further comprises the step of deleting an entry storing base address and size associated with said cleared watchpoint.

13. The method as recited in claim 8 wherein said step of stopping said debuggee is preceded by the step of executing at least a portion of said debuggee.

14. The method as recited in claim 13 wherein said step of executing at least a portion of said debuggee includes single stepping through said debuggee.

15. The method as recited in claim 8 wherein said step of disallowing access to regions in said memory associated with said watchpoints further comprises the step of determining whether said region in said memory associated with said watchpoint is writable and, if so, converting it to non-writable.

16. The method as recited in claim 15 further comprising the step of advising a user of an error if said regions in said memory associated with said watchpoints are non-writable if said determining step determines that said regions are already non-writable.

17. The method as recited in claim 8 wherein said step of providing notification further comprises the steps of determining if a watchpoint has been reached.

18. The method as recited in claim 17 wherein said step of determining if a watchpoint has been reached comprises the steps of comparing an address of watchpoints from step (a) and, if a match is found, advising that a watchpoint has been reached.

19. The method as recited in claim 18 further comprising the step of single stepping through an instruction that caused an exception, if a match is not found.

20. The method as recited in claim 19 further comprising the step of reprotecting said region of memory and instructing said debuggee to continue execution.

21. In a system for finding and eliminating errors in a debuggee program executable by a computer, said computer comprising memory for storing said debuggee program, a method for stopping execution of the debugee program upon attempted access to executable regions of the debugee program, the method comprising the steps of:

(a) finding executable regions in said memory belonging to said debuggee program;

(b) disallowing access to said executable regions in said memory;

(c) storing a base address and size corresponding to said executable regions; and (d) stopping the execution of said debuggee program when said debuggee attempts to access said executable regions.

22. The method of claim 21 further comprising the step of providing notification if said debuggee program has attempted to access one of said executable regions.

23. The method of claim 21 wherein said system invokes operating system memory management functions to retrieve memory information.

24. The method as recited in claim 21 further comprising the step of allowing access to said executable regions of memory and instructing said debuggee program to continue execution.

25. In a system for finding and eliminating errors in a debuggee program executable by a computer, said computer comprising memory for storing said debuggee program, a method for stopping execution of the debuggee program, said debuggee program including regions containing debuggable information, the method comprising the steps of:

(a) finding regions containing debuggable information in said memory belonging to said debuggee program;

(b) disallowing access to said regions in said memory;

(c) storing a base address and size corresponding to said regions; and (d) stopping the execution of said debuggee program when said debuggee attempts to access said regions.

26. The method of claim 25 further comprising the step of providing notification if said debuggee program has attempted to access said regions.

27. The method of claim 25 wherein said system invokes operating system memory management functions to retrieve memory information.

28. The method as recited in claim 25 further comprising the step of allowing access to said regions of memory and instructing said debuggee program to continue execution.

29. A method of debugging computer programs comprising:

writing at least a portion of a computer program;

debugging said at least a portion of a computer program by the steps of:
  i) disallowing access to a memory page in memory associated with a watchpoint, said watchpoint comprising a data member of said computer program stored at particular offset and size in said particular memory page of said memory;
  ii) executing said at least a portion of a computer program until an attempt is made to access said memory page; and
  iii) if said attempt to access includes an attempt to access said memory page at a memory location within a range specified by said offset and size, stopping execution of the computer program.

* * * * *